United States Patent
Yang et al.

(10) Patent No.: US 12,164,387 B2
(45) Date of Patent: Dec. 10, 2024

(54) HYBRID DATA TRANSFER MODEL FOR VIRTUAL MACHINE BACKUP AND RECOVERY

(71) Applicant: Rubrik, Inc., Palo Alto, CA (US)

(72) Inventors: Yang Yang, Sunnyvale, CA (US); Hao Zhou, Mountain View, CA (US); Li Ding, Cupertino, CA (US); Yiyao Wu, Mountain View, CA (US)

(73) Assignee: Rubrik, Inc., Palo Alto, CA (US)

( * ) Notice: Subject to any disclaimer, the term of this patent is extended or adjusted under 35 U.S.C. 154(b) by 131 days.

(21) Appl. No.: 17/694,237

(22) Filed: Mar. 14, 2022

(65) Prior Publication Data

US 2023/0289263 A1 Sep. 14, 2023

(51) Int. Cl.
*G06F 11/14* (2006.01)
*G06F 9/455* (2018.01)
*G06F 11/30* (2006.01)

(52) U.S. Cl.
CPC ...... *G06F 11/1464* (2013.01); *G06F 9/45558* (2013.01); *G06F 11/1451* (2013.01); *G06F 11/3006* (2013.01); *G06F 2009/45579* (2013.01)

(58) Field of Classification Search
CPC ............ G06F 11/1464; G06F 11/1451; G06F 11/3006; G06F 9/45558; G06F 2009/45579; G06F 11/1456; G06F 11/1461; G06F 11/1458; G06F 9/45533; G06F 2201/815
See application file for complete search history.

(56) References Cited

U.S. PATENT DOCUMENTS

| | | | |
|---|---|---|---|
| 11,662,928 B1* | 5/2023 | Kumar | H04L 9/0894 713/150 |
| 2016/0352588 A1* | 12/2016 | Subbarayan | H04L 45/58 |
| 2017/0090974 A1* | 3/2017 | Dornemann | H04L 67/56 |
| 2018/0139288 A1* | 5/2018 | Kitajima | H04L 41/12 |
| 2019/0384496 A1* | 12/2019 | Abdul Rasheed | G06F 11/1461 |
| 2020/0110672 A1* | 4/2020 | Srinivasan | H04L 67/34 |
| 2020/0183797 A1* | 6/2020 | Juniwal | G06F 9/45558 |
| 2021/0289025 A1* | 9/2021 | Littlefield | G06F 11/1451 |
| 2022/0292001 A1* | 9/2022 | Chopra | G06F 11/3409 |
| 2023/0106327 A1* | 4/2023 | Grandhi | G06F 11/1461 707/654 |
| 2023/0126685 A1* | 4/2023 | Ji | G06F 3/0619 718/1 |
| 2023/0236898 A1* | 7/2023 | McElhoe | H04L 67/56 718/1 |
| 2023/0267053 A1* | 8/2023 | Khanna | G06F 11/1451 714/4.11 |

* cited by examiner

*Primary Examiner* — Khoa D Doan
*Assistant Examiner* — Tong B. Vo
(74) *Attorney, Agent, or Firm* — Holland & Hart LLP

(57) ABSTRACT

A storage cluster may dynamically select a data transport mode for supporting a backup or export job. The storage cluster may receive a trigger indication to create, a backup of data of a source virtual machine. The storage cluster may select a data transport mode to use for reading the data from the source virtual machine to create the backup at the storage cluster. The selection may be from a set of data transport modes that includes a proxy virtual machine mode and a direct-to-host mode. The storage cluster may transmit, to a host for the source virtual machine, a request to activate the selected data transport mode, and receive the data from the source virtual machine via the selected data transport mode. The storage cluster may use the data to create the backup.

20 Claims, 13 Drawing Sheets

HYBRID DATA TRANSFER MODEL FOR VIRTUAL MACHINE BACKUP AND RECOVERY

FIELD OF TECHNOLOGY

The present disclosure relates generally to database systems and data processing, and more specifically to hybrid data transfer model for virtual machine backup and recovery.

BACKGROUND

A computing system may be employed to manage, process, backup, and restore data using a network of computing devices.

A data management system may read data from and write data to virtual machine environments to support environment backup and recovery. For example, a data management system may periodically read data from a source system to support backup of a virtual machine executing on the source system, and the data management system may write data to a target system to support recovery of a virtual machine associated with a backup. Various data transport modes may be used to read/write data, and there may be tradeoffs between using one of these data transport modes over another.

DETAILED DESCRIPTION

Figure 1:
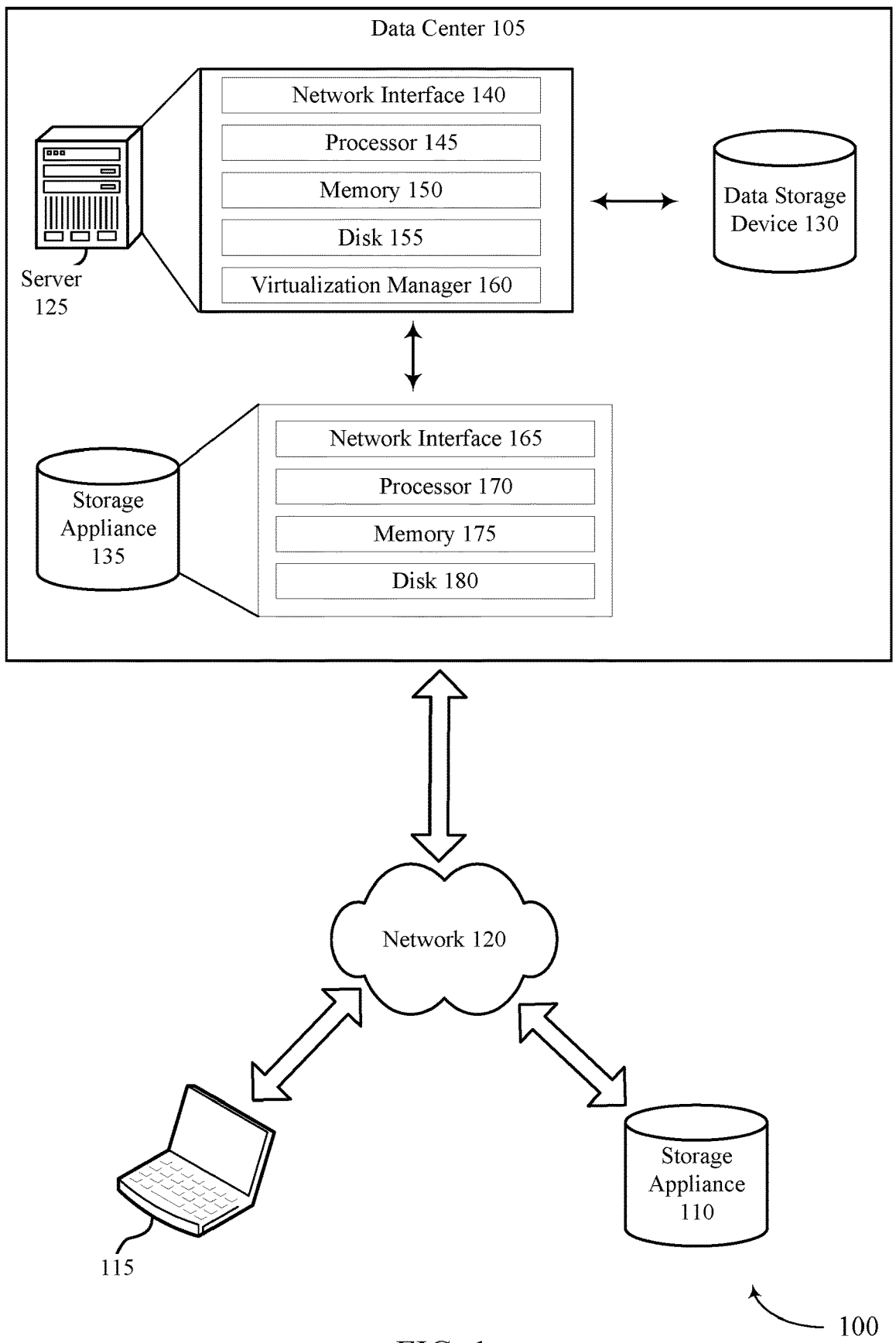
FIG. 1 illustrates an example of a data management system that supports hybrid data transfer model for virtual machine backup and recovery in accordance with aspects of the present disclosure.

Some computing systems may utilize virtual machines to support application execution and management of data associated with the applications. For example, the virtual machines may support a webserver, a database server, or logic for other types of services. The virtual machine may virtualize a set of physical computing systems (e.g., data storage devices) in order to manage data storage, processing, and retrieval in support of the applications. In some examples, these computing systems may periodically generate snapshots of a virtual machine, and the snapshot may represent a current state of the virtual machine. If a virtual machine fails, a failover procedure may be used to replicate the virtual machine using a snapshot.

For virtual machine backup and replication, data may be read from and written to systems that host the virtual machines. For example, a data management system may periodically read data from a source system to support backup of a virtual machine executing on the source system, and the data management system may write data to a target system to support recovery of a virtual machine associated with a backup to a target system. Various data transport modes may be used to read/write data, and there may be tradeoffs between using one of these data transport modes over another.

Techniques described herein support dynamically (e.g., automatically) selecting a data transport mode for supporting backup and/or recovery of a virtual machine. The selection may be between a direct-to-host data transport mode and a proxy virtual machine data transport mode. If a backup is a full backup (e.g., initial full or forced full), then the proxy data transport mode may be selected because it may support faster reading/writing large amounts of data. If the backup is an incremental backup, then the direct-to-host data transport mode may be selected to avoid incurring the overhead of instantiating a proxy virtual machine to read/write a small amount of data. In some cases, the size of the data to read or write may be considered for selection of the data transport mode. Additional techniques described herein support using on-demand proxy virtual machines, persistent proxy virtual machines, sharing of proxies between backup jobs, and scaling the amount of proxies based on the workload of the backup job, including various optimizations related to such additional functions. Thus, using the described techniques, the backup/recovery may be efficiently performed while balancing resource overhead and speed. These techniques are described in further detail with respect to the figures.

Aspects of the disclosure are initially described in the context of an environment supporting an on-demand database service. Aspects of the disclosure are further described with respect to computing systems that illustrate different data transport modes, further implementations of a proxy virtual machine data transport mode, and a process flow diagram. Aspects of the disclosure are further illustrated by and described with reference to apparatus diagrams, system diagrams, and flowcharts that relate to hybrid data transfer model for virtual machine backup and recovery.

FIG. 1 illustrates an example of a computing environment 100 for cloud computing that supports hybrid data transfer model for virtual machine backup and recovery in accordance with various aspects of the present disclosure. The computing environment 100 may include a data center 105, a storage appliance 110, and a computing device 115 in communication with each other via one or more networks 120. The computing environment 100 may also include one or more computing devices interconnected through one or more networks 120. The one or more networks 120 may allow computing devices or storage devices to connect to and communicate with other computing devices or other storage devices. In some examples, the computing environment 100 may include other computing devices or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive, a solid-state drive, or a data storage system.

The data center 105 may include one or more servers, such as server 125, in communication with one or more storage devices, such as storage device 130. The one or more servers may also be in communication with one or more storage appliances, such as storage appliance 135. The server 125, storage device 130, and storage appliance 135 may be in communication with each other via a networking fabric connecting servers and data storage units within the data center 105 to each other. The storage appliance 135 may include a data management system for backing up virtual machines or files within a virtualized infrastructure. The server 125 may be used to create and manage one or more virtual machines associated with a virtualized infrastructure.

The one or more virtual machines may run various applications, such as a database application or a web server. The storage device 130 may include one or more hardware storage devices for storing data, such as a hard disk drive (HDD), a magnetic tape drive, a solid-state drive (SSD), a storage area network (SAN) storage device, or a Network Attached Storage (NAS) device. In some cases, a data center, such as data center 105, may include multiple servers and/or data storage devices in communication with each other. The one or more data storage devices 130 may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

The one or more networks 120 may include a secure network such as an enterprise private network, an unsecure network such as a wireless open network, a local area network (LAN), a wide area network (WAN), and the Internet. The one or more networks 120 may include a cellular network, a mobile network, a wireless network, or a wired network. Each network of the one or more networks 120 may include hubs, bridges, routers, switches, and wired transmission media such as a direct-wired connection. The one or more networks 120 may include an extranet or other private network for securely sharing information or providing controlled access to applications or files.

A server, such as server 125, may allow a client to download information or files (e.g., executable, text, application, audio, image, or video files) from the server 125 or to perform a search query related to particular information stored on the server 125. In some examples, a server may act as an application server or a file server. In general, server 125 may refer to a hardware device that acts as the host in a client-server relationship or a software process that shares a resource with or performs work for one or more clients.

One example of server 125 includes a network interface 140, processor 145, memory 150, disk 155, and virtualization manager 160 all in communication with each other. network interface 140 allows server 125 to connect to one or more networks 120. network interface 140 may include a wireless network interface and/or a wired network interface. Processor 145 allows server 125 to execute computer-readable instructions stored in memory 150 in order to perform processes described herein. Processor 145 may include one or more processing units, such as one or more CPUs and/or one or more GPUs. Memory 150 may comprise one or more types of memory (e.g., random access memory (RAM), static-RAM (SRAM), dynamic-RAM (DRAM), read-only memory (ROM), electric erasable programmable ROM (EEPROM), Flash, etc.). Disk 155 may include a hard disk drive and/or a solid-state drive. Memory 150 and disk 155 may comprise hardware storage devices.

The virtualization manager 160 may manage a virtualized infrastructure and perform management operations associated with the virtualized infrastructure. The virtualization manager 160 may manage the provisioning of virtual machines running within the virtualized infrastructure and provide an interface to computing devices interacting with the virtualized infrastructure. In one example, the virtualization manager 160 may set a virtual machine having a virtual disk into a frozen state in response to a snapshot request made via an application programming interface (API) by a storage appliance, such as storage appliance 135. Setting the virtual machine into a frozen state may allow a point in time snapshot of the virtual machine to be stored or transferred. In one example, updates made to a virtual machine that has been set into a frozen state may be written to a separate file (e.g., an update file) while the virtual disk may be set into a read-only state to prevent modifications to the virtual disk file while the virtual machine is in the frozen state.

The virtualization manager 160 may then transfer data associated with the virtual machine (e.g., an image of the virtual machine or a portion of the image of the virtual disk file associated with the state of the virtual disk at the point in time it is frozen) to a storage appliance (for example, a storage appliance 135 or storage appliance 110 of FIG. 1, described further below) in response to a request made by the storage appliance. After the data associated with the point in time snapshot of the virtual machine has been transferred to the storage appliance 135, the virtual machine may be released from the frozen state (i.e., unfrozen) and the updates made to the virtual machine and stored in the separate file may be merged into the virtual disk file. The virtualization manager 160 may perform various virtual machine-related tasks, such as cloning virtual machines, creating new virtual machines, monitoring the state of virtual machines, moving virtual machines between physical hosts for load balancing purposes, and facilitating backups of virtual machines.

The storage appliance 135 may include a network interface 165, processor 170, memory 175, and disk 180 in communication with each other. Network interface 165 may support communication of storage appliance 135 with one or more networks. Network interface 165 may include a wireless network interface and/or a wired network interface. Processor 170 may support storage appliance in execution of computer-readable instructions stored in memory 175 to perform operations described herein. Processor 170 may include one or more processing units, such as one or more central processing units (CPUs) and/or one or more graphics processing units (GPUs). Memory 175 may comprise one or more types of memory as described with respect to memory 150. Disk 180 may include a hard disk drive and/or a solid-state drive. Memory 175 and disk 180 may comprise hardware storage devices.

The storage appliance 135 or storage appliance 110 may include multiple machines, and the multiple machines may comprise multiple nodes of a server cluster. The server cluster may comprise a set of physical machines that are connected together via a network. The server cluster may be used for storing data associated with a plurality of virtual machines, such as backup data associated with different point-in-time versions of the virtual machines.

The networked computing environment 100 may provide a cloud computing environment for one or more computing devices. Cloud computing may refer to Internet-based computing, wherein shared resources, software, and/or information may be provided to one or more computing devices on-demand via the Internet. The networked computing environment 100 may comprise a cloud computing environment providing Software-as-a-Service (SaaS) or Infrastructure-as-a-Service (IaaS) services. SaaS may refer to a software distribution model in which applications are hosted by a service provider and made available to end users over the Internet. In one example, the networked computing environment 100 may include a virtualized infrastructure that provides software, data processing, and/or data storage services to end users accessing the services via the networked computing environment 100. In one example, networked computing environment 100 may provide cloud-based work productivity or business-related applications to a computing device, such as computing device 115. The storage appliance 110 may comprise a cloud-based data management system for backing up virtual machines and/or files within a virtualized infrastructure, such as virtual machines running on server 125 or files stored on server 125.

In some examples, networked computing environment 100 may provide remote access to secure applications and files stored within data center 105 from a remote computing device, such as computing device 115. The data center 105 may use an access control application to manage remote access to protected resources, such as protected applications, databases, or files located within the data center 105. To facilitate remote access to secure applications and files, a secure network connection may be established using a virtual private network (VPN). A VPN connection may allow a remote computing device, such as computing device 115, to securely access data from a private network (e.g., from a company file server or mail server) using an unsecure public network or the Internet. The VPN connection may use client-side software (e.g., running on the remote computing device) to establish and maintain the VPN connection. The VPN client software may provide data encryption and encapsulation prior to the transmission of secure private network traffic through the Internet.

In some examples, the storage appliance 135 or storage appliance 110 may manage the extraction and storage of virtual machine snapshots associated with different point in time versions of one or more virtual machines running within the data center 105. A snapshot of a virtual machine may correspond with a state of the virtual machine at a particular point-in-time. In response to a restore command from the storage device 130, the storage appliance 135 may restore a point-in-time version of a virtual machine or restore point-in-time versions of one or more files located on the virtual machine and transmit the restored data to the server 125. In response to a mount command from the server 125, the storage appliance 135 may allow a point-in-time version of a virtual machine to be mounted and allow the server 125 to read and/or modify data associated with the point-in-time version of the virtual machine. To improve storage density, the storage appliance 135 may deduplicate and compress data associated with different versions of a virtual machine and/or deduplicate and compress data associated with different virtual machines. To improve system performance, the storage appliance 135 may first store virtual machine snapshots received from a virtualized environment in a cache, such as a flash-based cache. The cache may also store popular data or frequently accessed data (e.g., based on a history of virtual machine restorations, incremental files associated with commonly restored virtual machine versions) and current day incremental files or incremental files corresponding with snapshots captured within the past 24 hours.

An incremental file may comprise a forward incremental file or a reverse incremental file. A forward incremental file may include a set of data representing changes that have occurred since an earlier point-in-time snapshot of a virtual machine. To generate a snapshot of the virtual machine corresponding with a forward incremental file, the forward incremental file may be combined with an earlier point in time snapshot of the virtual machine (e.g., the forward incremental file may be combined with the last full image of the virtual machine that was captured before the forward incremental file was captured and any other forward incremental files that were captured subsequent to the last full image and prior to the forward incremental file). A reverse incremental file may include a set of data representing changes from a later point-in-time snapshot of a virtual machine. To generate a snapshot of the virtual machine corresponding with a reverse incremental file, the reverse incremental file may be combined with a later point-in-time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 135 or storage appliance 110 may provide a user interface (e.g., a web-based interface or a graphical user interface) that displays virtual machine backup information such as identifications of the virtual machines protected and the historical versions or time machine views for each of the virtual machines protected. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

The user interface may enable an end user of the storage appliance 110 (e.g., a system administrator or a virtualization administrator) to select a particular version of a virtual machine to be restored or mounted. When a particular version of a virtual machine has been mounted, the particular version may be accessed by a client (e.g., a virtual machine, a physical machine, or a computing device) as if the particular version was local to the client. A mounted version of a virtual machine may correspond with a mount point directory (e.g., /snapshots/VM5Nersion23). In one example, the storage appliance 110 may run a Network File System (NFS) server and make the particular version (or a copy of the particular version) of the virtual machine accessible for reading and/or writing. The end user of the storage appliance 110 may then select the particular version to be mounted and run an application (e.g., a data analytics application) using the mounted version of the virtual machine. In another example, the particular version may be mounted as an Internet Small Computer Systems Interface (iSCSI) target.

As described herein, the storage appliance 135 may support ingestion or reading of backup data (e.g., snapshot) of a virtual machine environment to support virtual machine backup and recovery. In some cases, to support virtual machine backup, the storage appliance 135 may ingest the data from a virtual machine datastore (e.g., disk 155 or data storage device 130). For virtual machine recovery, the storage appliance 135 may export data to a datastore (e.g., disk 155 or data storage device 130) for a virtual machine. In some cases, for reading or writing data, the storage appliance may utilize a direct-to-host data transport mode in which data is read/written using a centralized management utility of the virtual machine host (e.g., the virtualization manager 160).

However, utilization of the centralized management utility to read/write data may be slow due to input/output bottlenecks on the virtual machine hosts. For example, the virtual machine hosts may prioritize internal I/O operations for a virtual machine over external I/O operations. As I/O operations by the storage appliance 135 for backup and recovery may be external (e.g., because the I/O operations originate with the external storage appliance 135), these operations may be deprioritized relative to the internal I/O operations. When reading data for backing up an entire virtual machine disc image, the reduced priority may result in slow backup operations, which may risk the backup being out of service level agreement compliance.

In some cases, the storage appliance 135 may utilize a proxy virtual machine mode to read/write data for virtual machine backup or recovery. In the proxy virtual machine mode, a proxy virtual machine may be instantiated at the virtual machine host (e.g., the server 125) and the virtual disk of the virtual machine may be attached or virtually mounted to the proxy virtual machine. In this case, the I/O prioritization by the centralized management utility may be avoided, and as a result, the proxy virtual machine mode may result in improved read/write times for virtual machine backup or recovery. However, instantiation of a proxy virtual machine at the virtual machine host may come with some overhead. When a small amount of data is to be read/written, the proxy virtual machine mode may not be worth the overhead of virtual machine instantiation.

Thus, implementations described support dynamic selection between a direct-to-host mode or a proxy virtual machine mode for reading or writing data in support of virtual machine backup or recovery. The selection may be based on the type of operation (e.g., backup or read vs. recovery or write), whether a backup is a full or incremental backup, the size or amount of data to be read or written, or a combination thereof. Further, in the case of selection of the proxy virtual machine mode, the implementations described herein may support selection of a number of proxy virtual machines to use for a job (e.g., backup), using multiple proxies for one job, and sharing proxy virtual machines between jobs of the same or different types.

It is to be understood that one or more aspects of the disclosure may be implemented in a computing environment 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
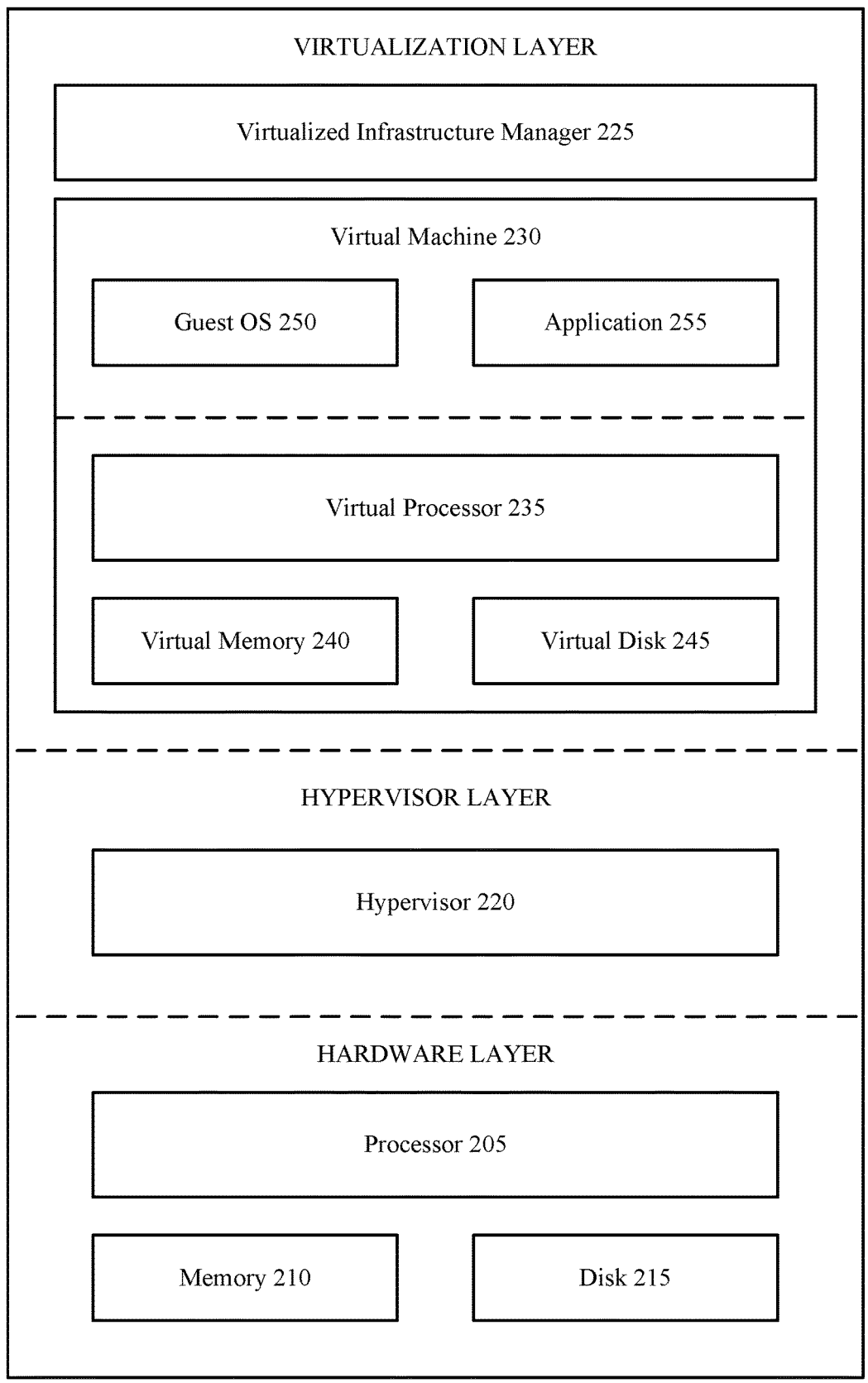
FIG. 2 illustrates an example of a server that supports hybrid data transfer model for virtual machine backup and recovery in accordance with aspects of the present disclosure.

FIG. 2 illustrates an example of a server 200 that supports hybrid data transfer model for virtual machine backup and recovery in accordance with aspects of the present disclosure. The server 200 may be an example of a server 125 described with reference to FIG. 1. The server 200 may include one server out of a plurality of servers that are networked together within a data center (e.g., data center 105 described with reference to FIG. 1). In one example, the plurality of servers may be positioned within one or more server racks within the data center. As depicted, the server 200 includes hardware-level components and software-level components. The hardware-level components include one or more processors 205, one or more memory 210, and one or more disks 215. The software-level components include a hypervisor 220, a virtualized infrastructure manager 225, and one or more virtual machines, such as virtual machine 230. The hypervisor 220 may include a native hypervisor or a hosted hypervisor. The hypervisor 220 may provide a virtual operating platform for running one or more virtual machines, such as virtual machine 230. Virtual machine 230 includes a plurality of virtual hardware devices including a virtual processor 235, a virtual memory 240, and a virtual disk 245. The virtual disk 245 may include a file stored within the one or more disks 245. In one example, a virtual machine 230 may include a plurality of virtual disks 245, with each virtual disk of the plurality of virtual disks 245 associated with a different file stored on the one or more disks 245. Virtual machine 230 may include a guest operating system 250 that runs one or more applications, such as application 255.

The virtualized infrastructure manager 225, which may be an example of the virtualization manager 160 described with reference to FIG. 1, may run on a virtual machine or natively on the server 200. The virtual machine may, for example, be or include the virtual machine 230 or a virtual machine separate from the server 200. Other arrangements are possible. The virtualized infrastructure manager 225 may provide a centralized platform for managing a virtualized infrastructure that includes a plurality of virtual machines. The virtualized infrastructure manager 225 may manage the provisioning of virtual machines running within the virtualized infrastructure and provide an interface to computing devices interacting with the virtualized infrastructure. The virtualized infrastructure manager 225 may perform various virtualized infrastructure related tasks, such as cloning virtual machines, creating new virtual machines, monitoring the state of virtual machines, and facilitating backups of virtual machines.

In an example, the server 200 may use the virtualized infrastructure manager 225 to facilitate backups for a plurality of virtual machines running on the server 200. One or more of the virtual machines running on the server 200 may run its own guest operating system and its own set of applications. Each virtual machine running on the server 200 may store its own set of files using one or more virtual disks associated with the virtual machine (e.g., each machine may include two virtual disks that are used for storing data associated with the virtual machine).

In an example, a data management application running on a storage appliance, such as storage appliance 110 in FIG. 1 or storage appliance 135 in FIG. 1, may request a snapshot of a virtual machine running on server 200. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time and a second snapshot of the virtual machine may correspond with a second state of the virtual machine at a second point in time subsequent to the first point in time.

In response to a request for a snapshot of a virtual machine at a particular point in time, the virtualized infrastructure manager 225 may set the virtual machine into a frozen state or store a copy of the virtual machine at the particular point in time. The virtualized infrastructure manager 225 may then transfer data associated with the virtual machine (e.g., an image of the virtual machine or a portion of the image of the virtual machine) to the storage appliance 110 or storage appliance 135. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 225 may transfer a full image of the virtual machine to the storage appliance 110 or storage appliance 135 of FIG. 1 or a plurality of data blocks corresponding with the full image (e.g., to enable a full image-level backup of the virtual machine to be stored on the storage appliance). In other cases, the virtualized infrastructure manager 225 may transfer a portion of an image of the virtual machine associated with data that has changed since an earlier point in time prior to the particular point in time or since a last snapshot of the virtual machine was taken. In one example, the virtualized infrastructure manager 225 may transfer data associated with virtual blocks stored on a virtual disk of the virtual machine that have changed since the last snapshot of the virtual machine was taken. In one example, the data management application may specify a first point in time and a second point in time and the virtualized infrastructure manager 225 may output one or more virtual data blocks associated with the virtual machine that have been modified between the first point in time and the second point in time.

In some examples, the server 200 or the hypervisor 220 may communicate with a storage appliance, such as storage appliance 110 in FIG. 1 or storage appliance 135 in FIG. 1, using a distributed file system protocol such as NFS Version 3, or Server Message Block (SMB) protocol. The distributed file system protocol may allow the server 200 or the hypervisor 220 to access, read, write, or modify files stored on the storage appliance as if the files were locally stored on the server 200. The distributed file system protocol may allow the server 200 or the hypervisor 220 to mount a directory or a portion of a file system located within the storage appliance.

As described herein, the server 200 may support various virtual machines 230 that a support applications 255, such as an application server, webserver, and/or database server. Further, the server 200 may support the virtualized infrastructure manager 225 that may implement techniques for virtual machine backup and recovery. Further, another system, such as a storage appliance described herein, may read data from virtual machines 230 for extended backup and recovery techniques. In some cases, the other system may read or write data using various data transport modes. In a direct-to-host data transport mode, the data may be read from or written to the virtual disk 245 via a centralized management utility (e.g., virtualized infrastructure manager 225). In some cases, a centralized management utility may be configured to prioritize internal I/O operations over external I/O operations. Example internal I/O operations may include I/O operations triggered by the applications 255 supported by the virtual machine 230, and example external I/O operations may be operations triggered by an external storage appliance for backup/recovery procedures. In a proxy virtual machine data transport mode, a proxy virtual machine may be instantiated at the server 200, and the virtual disk 245 may be attached to the proxy virtual machine. The proxy virtual machine may then read or write data directly from/to the virtual disk 245. In some cases, the proxy virtual machine mode may read or write data faster than the direct-to-host mode, but insanitation of the proxy virtual machine may come with some resource overhead.

Implementations described herein support selection, by another system, of a data transport mode for ingestion of data from virtual machine 230 or writing data to a virtual machine 230 for virtual machine backup and recovery procedures. The selection of the data transport mode may be based on job type (e.g., backup or recovery), backup type (e.g., full or incremental), size of data to be read/written, or a combination thereof. Additional implementations described herein support selection and utilization of a number of proxy virtual machines to support a job, sharing proxy virtual machines between multiple backup and/or recovery jobs, and other techniques for supporting backup and recovery of virtual machines.

Figure 3:
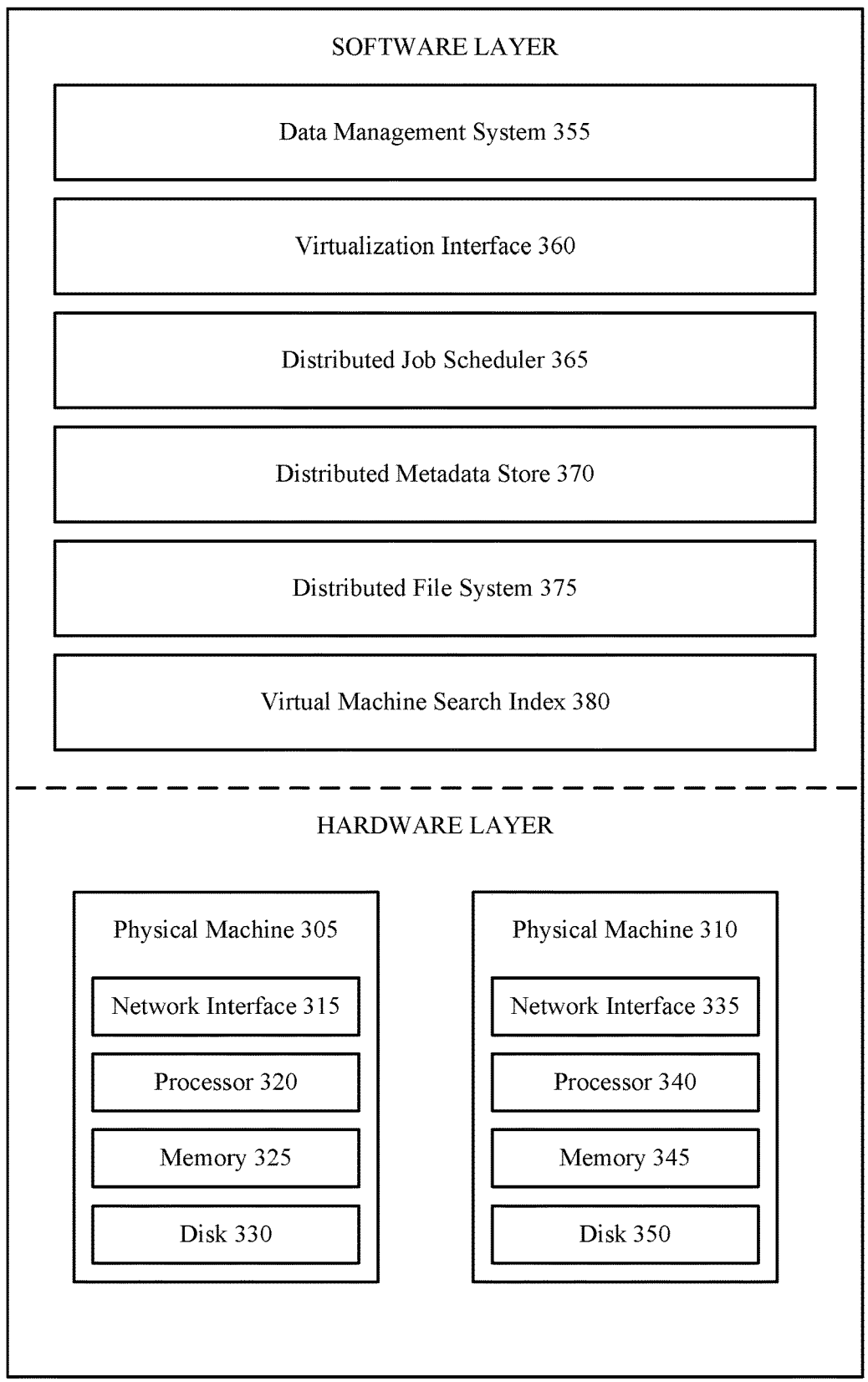
FIG. 3 illustrates an example of a storage appliance that supports hybrid data transfer model for virtual machine backup and recovery in accordance with aspects of the present disclosure.

FIG. 3 illustrates an example of a storage appliance 300 that supports hybrid data transfer model for virtual machine backup and recovery in accordance with aspects of the present disclosure. The storage appliance 300 may be an example of a storage appliance 110 or a storage appliance 135 as described with reference to FIG. 1. The storage appliance 300 may include a plurality of physical machines that may be grouped together and presented as a single computing system. One or more of the physical machines of the plurality of physical machines may comprise a node in a cluster. A cluster may be configured as a failover cluster for performing one or more failover operations as described herein. In one example, the storage appliance 300 may be positioned within a server rack within a data center, such as data center 105 as described with reference to FIG. 1. As depicted, the storage appliance 300 includes hardware-level components and software-level components. The hardware-level components include one or more physical machines, such as physical machine 305 and physical machine 310. The physical machine 305 includes a network interface 315, processor 320, memory 325, and disk 330 all in communication with each other. Processor 320 allows physical machine 305 to execute computer readable instructions stored in memory 325 to perform processes described herein. Disk 330 may include a hard disk drive and/or a solid-state drive. The physical machine 310 may include a network interface 335, processor 340, memory 345, and disk 350 all in communication with each other. Processor 340 allows physical machine 310 to execute computer readable instructions stored in memory 345 to perform processes described herein. Disk 350 may include a hard disk drive and/or a solid-state drive. In some examples, disk 350 may include a flash-based SSD or a hybrid HDD/SSD drive. In one example, the storage appliance 300 may include a plurality of physical machines arranged in a cluster. One or more of the plurality of physical machines may include a plurality of multi-core CPUs, RAM (e.g., 108 GB of RAM), SSD space (e.g., a 500 GB SSD), HDD space (e.g., four 4 TB HDDs), and a network interface controller.

In some examples, the plurality of physical machines may be used to implement a cluster-based network fileserver. The cluster-based network file server may neither require nor use a front-end load balancer. One issue with using a front-end load balancer to host the IP address for the cluster-based network file server and to forward requests to the nodes of the cluster-based network file server is that the front-end load balancer comprises a single point of failure for the cluster-based network file server. In some cases, the file system protocol used by a server, such as server 125 in FIG. 1, or a hypervisor, such as hypervisor 220 in FIG. 2, to communicate with the storage appliance 135 or storage appliance 110 may not provide a failover mechanism (e.g., NFS Version 3). In the case that no failover mechanism is provided on the client side, the hypervisor may not be able to connect to a new node within a cluster in the event that the node connected to the hypervisor fails.

In some examples, each node in a cluster may be connected to each other via a network and may be associated with one or more IP addresses (e.g., two different IP addresses may be assigned to each node). In one example, each node in the cluster may be assigned a permanent IP address and a floating IP address and may be accessed using either the permanent IP address or the floating IP address. In this case, a hypervisor, such as hypervisor 220 in FIG. 2, may be configured with a first floating IP address associated with a first node in the cluster. The hypervisor may connect to the cluster using the first floating IP address. In one example, the hypervisor may communicate with the cluster using a distributed file system protocol (e.g., NFS Version 3 protocol). One or more nodes in the cluster may run a Virtual Router Redundancy Protocol (VRRP) daemon. A daemon may include a background process. Each VRRP daemon may include a list of all floating IP addresses available within the cluster. In the event that the first node associated with the first floating IP address fails, one of the VRRP daemons may automatically assume or pick up the first floating IP address if no other VRRP daemon has already assumed the first floating IP address. Therefore, if the first node in the cluster fails or otherwise goes down, then one of the remaining VRRP daemons running on the other nodes in the cluster may assume the first floating IP address that is used by the hypervisor for communicating with the cluster.

In order to determine which of the other nodes in the cluster will assume the first floating IP address, a VRRP priority may be established. In one example, given a number (N) of nodes in a cluster from node(0) to node(N−1), for a floating IP address (i), the VRRP priority of node G may be G−i modulo N. In another example, given a number (N) of nodes in a cluster from node(0) to node(N−1), for a floating IP address (i), the VRRP priority of node G may be (i−j) modulo N. In these cases, node G will assume floating IP address (i) if its VRRP priority is higher than that of any other node in the cluster that is alive and announcing itself on the network. Thus, if a node fails, then there may be a clear priority ordering for determining which other node in the cluster will take over the failed node's floating IP address.

In some examples, a cluster may include a plurality of nodes and one or more nodes of the plurality of nodes may be assigned a different floating IP address. In such examples, a first hypervisor may be configured with a first floating IP address associated with a first node in the cluster, a second hypervisor may be configured with a second floating IP address associated with a second node in the cluster, and a third hypervisor may be configured with a third floating IP address associated with a third node in the cluster.

As depicted in FIG. 3, the software-level components of the storage appliance 300 may include data management system 355, a virtualization interface 360, a distributed job scheduler 365, a distributed metadata store 370, a distributed file system 375, and one or more virtual machine search indexes, such as virtual machine search index 380. In one example, the software-level components of the storage appliance 300 may be run using a dedicated hardware-based appliance. Additionally or alternatively, the software-level components of the storage appliance 300 may be run from the cloud (e.g., the software-level components may be installed on a cloud service provider).

In some examples, the data storage across a plurality of nodes in a cluster may be aggregated and made available over a single file system namespace (e.g., /snapshots/). For example, the data storage available from the one or more physical machines (e.g., physical machine 305 and physical machine 310) may be made available of a single file system namespace. A directory for each virtual machine protected using the storage appliance 300 may be created (e.g., the directory for Virtual Machine A may be/snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in /snapshots/VM_A/s1/and a second snapshot of Virtual Machine A may reside in /snapshots/VM_A/s2/).

The distributed file system 375 may present itself as a single file system, so that as new physical machines or nodes are added to the storage appliance 300, the cluster may automatically discover the additional nodes and automatically increase the available capacity of the file system for storing files and other data. Each file stored in the distributed file system 375 may be partitioned into one or more chunks or shards. Each of the one or more chunks may be stored within the distributed file system 375 as a separate file. The files stored within the distributed file system 375 may be replicated or mirrored over a plurality of physical machines, thereby creating a load-balanced and fault tolerant distributed file system. In one example, storage appliance 300 may include ten physical machines arranged as a failover cluster and a first file corresponding with a snapshot of a virtual machine (e.g., /snapshots/VM_A/s1/s1.full) may be replicated and stored on three of the ten machines.

The distributed metadata store 370 may include a distributed database management system that provides high availability without a single point of failure. In one example, the distributed metadata store 370 may comprise a database, such as a distributed document-oriented database. The distributed metadata store 370 may be used as a distributed key value storage system. In one example, the distributed metadata store 370 may include a distributed non-structured query language (NoSQL) key value store database. In some examples, the distributed metadata store 370 may include a partitioned row store, in which rows are organized into tables or other collections of related data held within a structured format within the key value store database. A table (or a set of tables) may be used to store metadata information associated with one or more files stored within the distributed file system 375. The metadata information may include the name of a file, a size of the file, file permissions associated with the file, when the file was last modified, and file mapping information associated with an identification of the location of the file stored within a cluster of physical machines. In one example, a new file corresponding with a snapshot of a virtual machine may be stored within the distributed file system 375 and metadata associated with the new file may be stored within the distributed metadata store 370. The distributed metadata store 370 may also be used to store a backup schedule for the virtual machine and a list of snapshots for the virtual machine that are stored using the storage appliance 300.

In some examples, the distributed metadata store 370 may be used to manage one or more versions of a virtual machine. Each version of the virtual machine may correspond with a full image snapshot of the virtual machine stored within the distributed file system 375 or an incremental snapshot of the virtual machine (e.g., a forward incremental or reverse incremental) stored within the distributed file system 375. In one example, the one or more versions of the virtual machine may correspond with a plurality of files. The plurality of files may include a single full image snapshot of the virtual machine and one or more incremental aspects derived from the single full image snapshot. The single full image snapshot of the virtual machine may be stored using a first storage device of a first type (e.g., a HDD) and the one or more incremental aspects derived from the single full image snapshot may be stored using a second storage device of a second type (e.g., an SSD). In this example, a single full image needs to be stored and each version of the virtual machine may be generated from the single full image or the single full image combined with a subset of the one or more incremental aspects. Further, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incremental aspects.

The distributed job scheduler 365 may be used for scheduling backup jobs that acquire and store virtual machine snapshots for one or more virtual machines over time. The distributed job scheduler 365 may follow a backup schedule to back up an entire image of a virtual machine at a particular point in time or one or more virtual disks associated with the virtual machine at the particular point in time. In one example, the backup schedule may specify that the virtual machine be backed up at a snapshot capture frequency, such as every two hours or every 24 hours. A backup job may be associated with one or more tasks to be performed in a sequence. One or more tasks associated with a job may be run on a particular node within a cluster. In some cases, the distributed job scheduler 365 may schedule a specific job to be run on a particular node based on data stored on the particular node. For example, the distributed job scheduler 365 may schedule a virtual machine snapshot job to be run on a node in a cluster that is used to store snapshots of the virtual machine in order to reduce network congestion.

The distributed job scheduler 365 may comprise a distributed fault tolerant job scheduler, in which jobs affected by node failures are recovered and rescheduled to be run on available nodes. In one example, the distributed job scheduler 365 may be fully decentralized and implemented without the existence of a master node. The distributed job scheduler 365 may run job scheduling processes on each node in a cluster or on a plurality of nodes in the cluster. In one example, the distributed job scheduler 365 may run a first set of job scheduling processes on a first node in the cluster, a second set of job scheduling processes on a second node in the cluster, and a third set of job scheduling processes on a third node in the cluster. The first set of job scheduling processes, the second set of job scheduling processes, and the third set of job scheduling processes may store information regarding jobs, schedules, and the states of jobs using a metadata store, such as distributed metadata store 370. In the event that the first node running the first set of job scheduling processes fails (e.g., due to a network failure or a physical machine failure), the states of the jobs managed by the first set of job scheduling processes may fail to be updated within a threshold period of time (e.g., a job may fail to be completed within 30 seconds or within minutes from being started). In response to detecting jobs that have failed to be updated within the threshold period of time, the distributed job scheduler 365 may undo and restart the failed jobs on available nodes within the cluster.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In one example, the job scheduling processes may detect that a particular task for a particular job has failed and in response may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The distributed job scheduler 365 may manage a job in which a series of tasks associated with the job are to be performed atomically (i.e., partial execution of the series of tasks is not permitted). If the series of tasks cannot be completely executed or there is any failure that occurs to one of the series of tasks during execution (e.g., a hard disk associated with a physical machine fails or a network connection to the physical machine fails), then the state of a data management system may be returned to a state as if none of the series of tasks were ever performed. The series of tasks may correspond with an ordering of tasks for the series of tasks and the distributed job scheduler 365 may ensure that each task of the series of tasks is executed based on the ordering of tasks. Tasks that do not have dependencies with each other may be executed in parallel.

In some examples, the distributed job scheduler 365 may schedule each task of a series of tasks to be performed on a specific node in a cluster. In other examples, the distributed job scheduler 365 may schedule a first task of the series of tasks to be performed on a first node in a cluster and a second task of the series of tasks to be performed on a second node in the cluster. In these examples, the first task may have to operate on a first set of data (e.g., a first file stored in a file system) stored on the first node and the second task may have to operate on a second set of data (e.g., metadata related to the first file that is stored in a database) stored on the second node. In some examples, one or more tasks associated with a job may have an affinity to a specific node in a cluster.

In one example, if the one or more tasks require access to a database that has been replicated on three nodes in a cluster, then the one or more tasks may be executed on one of the three nodes. In another example, if the one or more tasks require access to multiple chunks of data associated with a virtual disk that has been replicated over four nodes in a cluster, then the one or more tasks may be executed on one of the four nodes. Thus, the distributed job scheduler 365 may assign one or more tasks associated with a job to be executed on a particular node in a cluster based on the location of data required to be accessed by the one or more tasks.

In one example, the distributed job scheduler 365 may manage a first job associated with capturing and storing a snapshot of a virtual machine periodically (e.g., every 30 minutes). The first job may include one or more tasks, such as communicating with a virtualized infrastructure manager, such as the virtualized infrastructure manager 225 in FIG. 2, to create a frozen copy of the virtual machine and to transfer one or more chunks (or one or more files) associated with the frozen copy to a storage appliance, such as storage appliance 135 in FIG. 1. The one or more tasks may also include generating metadata for the one or more chunks, storing the metadata using the distributed metadata store 370, storing the one or more chunks within the distributed file system 375, and communicating with the virtualized infrastructure manager 225 that the frozen copy of the virtual machine may be unfrozen or released from a frozen state. The metadata for a first chunk of the one or more chunks may include information specifying a version of the virtual machine associated with the frozen copy, a time associated with the version (e.g., the snapshot of the virtual machine was taken at 5:30 p.m. on Jun. 29, 2018), and a file path to where the first chunk is stored within the distributed file system 375 (e.g., the first chunk is located at /snapshotsNM_B/s1/s1.chunk1). The one or more tasks may also include deduplication, compression (e.g., using a lossless data compression algorithm such as LZ4 or LZ77), decompression, encryption (e.g., using a symmetric key algorithm such as Triple DES or AES-256), and decryption related tasks.

The virtualization interface 360 may provide an interface for communicating with a virtualized infrastructure manager managing a virtualization infrastructure, such as virtualized infrastructure manager 225 in FIG. 2, and requesting data associated with virtual machine snapshots from the virtualization infrastructure. The virtualization interface 360 may communicate with the virtualized infrastructure manager using an API for accessing the virtualized infrastructure manager (e.g., to communicate a request for a snapshot of a virtual machine). In this case, storage appliance 300 may request and receive data from a virtualized infrastructure without requiring agent software to be installed or running on virtual machines within the virtualized infrastructure. The virtualization interface 360 may request data associated with virtual blocks stored on a virtual disk of the virtual machine that have changed since a last snapshot of the virtual machine was taken or since a specified prior point in time. Therefore, in some cases, if a snapshot of a virtual machine is the first snapshot taken of the virtual machine, then a full image of the virtual machine may be transferred to the storage appliance 300. However, if the snapshot of the virtual machine is not the first snapshot taken of the virtual machine, then the data blocks of the virtual machine that have changed since a prior snapshot was taken may be transferred to the storage appliance 300.

The virtual machine search index 380 may include a list of files that have been stored using a virtual machine and a version history for each of the files in the list. One or more version of a file may be mapped to the earliest point-in-time snapshot of the virtual machine that includes the version of the file or to a snapshot of the virtual machine that includes the version of the file (e.g., the latest point in time snapshot of the virtual machine that includes the version of the file). In one example, the virtual machine search index 380 may be used to identify a version of the virtual machine that includes a particular version of a file (e.g., a particular version of a database, a spreadsheet, or a word processing document). In some cases, each of the virtual machines that are backed up or protected using storage appliance 300 may have a corresponding virtual machine search index.

In one example, as each snapshot of a virtual machine is ingested, each virtual disk associated with the virtual machine is parsed in order to identify a file system type associated with the virtual disk and to extract metadata (e.g., file system metadata) for each file stored on the virtual disk. The metadata may include information for locating and retrieving each file from the virtual disk. The metadata may also include a name of a file, the size of the file, the last time at which the file was modified, and a content checksum for the file. Each file that has been added, deleted, or modified since a previous snapshot was captured may be determined using the metadata (e.g., by comparing the time at which a file was last modified with a time associated with the previous snapshot). Thus, for every file that has existed within any of the snapshots of the virtual machine, a virtual machine search index (e.g., virtual machine search index 380) may be used to identify when the file was first created (e.g., corresponding with a first version of the file) and at what times the file was modified (e.g., corresponding with subsequent versions of the file). Each version of the file may be mapped to a particular version of the virtual machine that stores that version of the file.

In some examples, if a virtual machine includes a plurality of virtual disks, then a virtual machine search index may be generated for each virtual disk of the plurality of virtual disks. For example, a first virtual machine search index may catalog, and map files located on a first virtual disk of the plurality of virtual disks and a second virtual machine search index may catalog and map files located on a second virtual disk of the plurality of virtual disks. In this case, a global file catalog or a global virtual machine search index for the virtual machine may include the first virtual machine search index and the second virtual machine search index. A global file catalog may be stored for each virtual machine backed up by a storage appliance within a file system, such as distributed file system 375 in FIG. 3.

The data management system 355 may comprise an application running on the storage appliance 300 that manages and stores one or more snapshots of a virtual machine. In one example, the data management system 355 may comprise a highest-level layer in an integrated software stack running on the storage appliance. The integrated software stack may include the data management system 355, the virtualization interface 360, the distributed job scheduler 365, the distributed metadata store 370, and the distributed file system 375.

In some examples, the integrated software stack may run on other computing devices, such as a server or computing device 115 in FIG. 1. The data management system 355 may use the virtualization interface 360, the distributed job scheduler 365, the distributed metadata store 370, and the distributed file system 375 to manage and store one or more snapshots of a virtual machine. One or more snapshots of the virtual machine may correspond with a point-in-time version of the virtual machine. The data management system 355 may generate and manage a list of versions for the virtual machine. One or more versions of the virtual machine may map to or reference one or more chunks and/or one or more files stored within the distributed file system 375. Combined together, the one or more chunks and/or the one or more files stored within the distributed file system 375 may comprise a full image of the version of the virtual machine.

As described herein, the storage appliance 300 may support virtual machine backup and recovery procedures. For example, the storage appliance 300 may ingest backup data (e.g., snapshot data) from one or more virtual machines supported by a host system and store and/or persist the backup data at the disk 330 and/or 350 of the storage appliance 300 via the distributed file system 375 or at another storage system (e.g., a cloud storage system). If a virtual machine associated with backup supported by the storage appliance 300 fails, then the storage appliance 300 may support recovery of the virtual machine at a target system. Recovery of the virtual machine on a target or host system may include writing data of the virtual machine to a virtual disk. Thus, the storage appliance 300 may be configured to read and/or write virtual machine data to support backup and recovery procedures.

As described herein, the storage appliance 300 may utilize various data transport modes to read and write virtual machine data. These data transport modes may include a direct-to-host mode and a proxy virtual machine mode. As described herein, use of these modes may come with tradeoffs. For example, the proxy virtual machine mode may be faster for reading or writing large amounts of data, but instantiation and execution of the proxy virtual machine may utilize processing resources at the host system. Similarly, use of the direct-to-host mode may be slow for large amounts of data, but may be efficient when the amount of data to be read/written is relatively small.

Implementations described herein describe techniques for selection, by the storage appliance 300, of a data transport mode for a backup job or a recovery job for a virtual machine based on the type of job, size of the job, or a combination thereof. The storage appliance 300 may transmit a request to a host of a source machine a request to activate the data transport mode and receive the data of the source virtual machine via the selected data transport mode. The storage appliance 300 may use the data to create the backup. The storage appliance 300 may utilize a similar process for recovery of a virtual machine. In the case of selection of the proxy virtual machine mode, the storage appliance 300 may be configured to select a number of proxy virtual machines or share a proxy virtual machine among different jobs as described in further detail herein. Accordingly, the techniques described herein support selection of a data transport mode in order to support efficient data transfer, thereby improving latency at a storage system and maintaining service level agreement compliance.

Figure 4A:
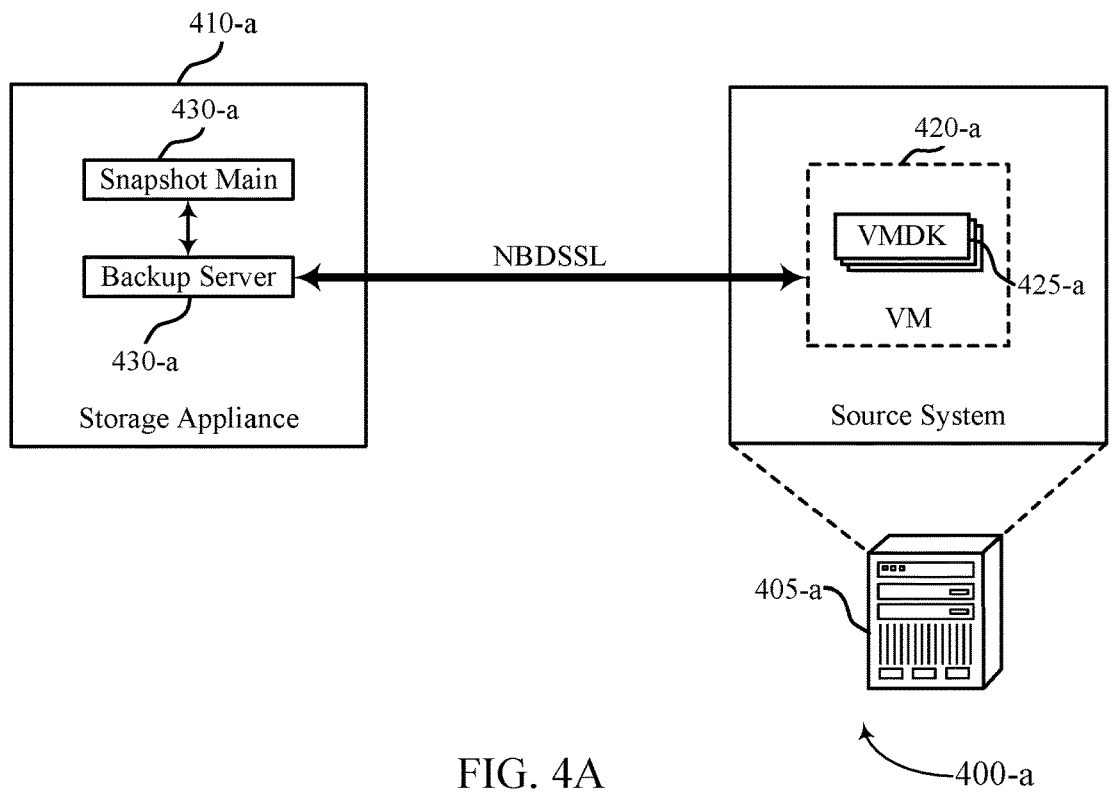
FIG. 4A and FIG. 4B illustrate examples of computing systems that support hybrid data transfer model for virtual machine backup and recovery in accordance with aspects of the present disclosure.
Figure 4B:
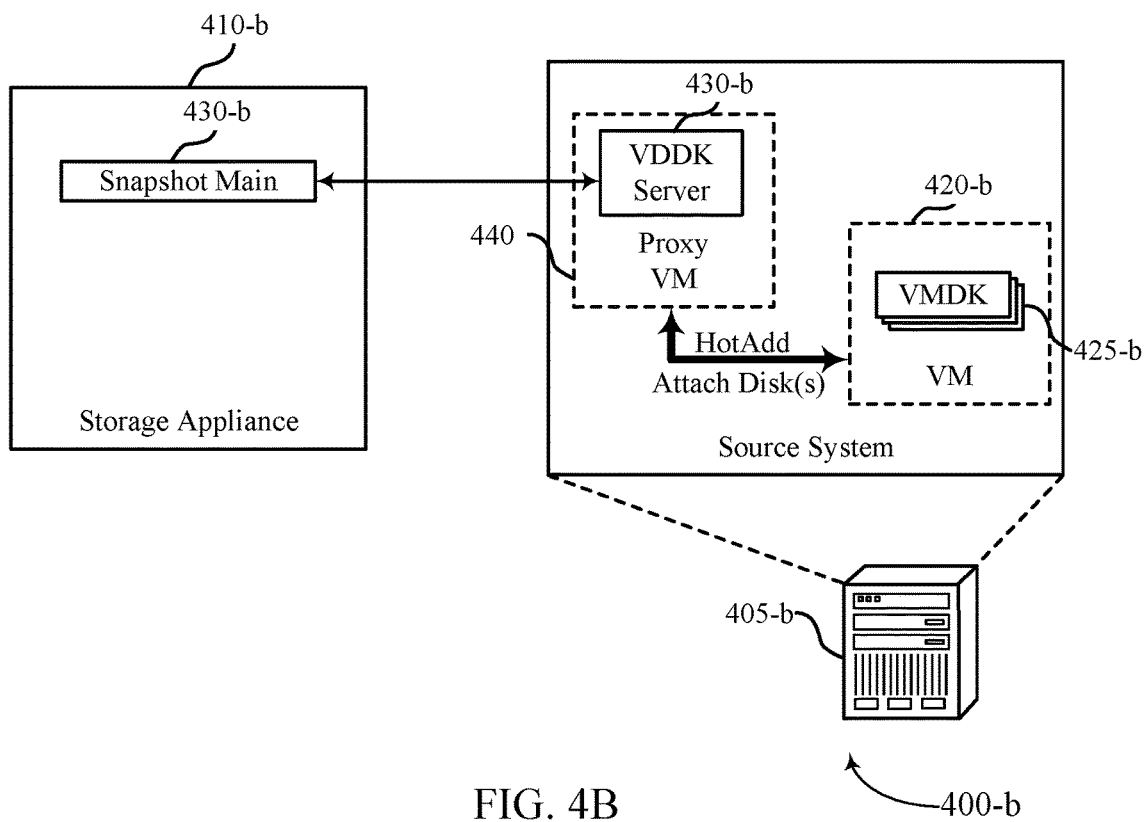

FIG. 4A and FIG. 4B illustrate examples of computing systems 400 that support hybrid data transfer model for virtual machine backup and recovery in accordance with various aspects of the present disclosure. The computing systems 400-a and 400-b include servers 405 and storage appliances 410. The server 405 may be an example of a server as described with respect to FIGS. 1 through 3 and may support a system for hosting virtual machines, such as virtual machine 420. The storage appliances 410 may be examples of a storage appliance as described with respect to FIGS. 1 through 3. A described herein, the storage appliances 410 may represent multiple machines and/or nodes of a storage cluster. The storage appliances 410 may support backup and recovery procedures as described herein. For example, the storage appliances 410 may interface with the servers 405 in support of backup and recovery procedures for virtual machines 420 and associated components (e.g., virtual disks 425) supported by the server 405.

To support virtual machine backup and recovery, the storage appliances 410 may be configured to read data associated with virtual machine 420 and/or write data associated with the virtual machine 420. For example, to support backup procedures, the storage appliance 410-a may periodically read backup data (e.g., snapshots) for the virtual machine 420. In some cases, a backup job is triggered by a schedule or by a user activating a backup job. Reading data may include reading full data images of the virtual machine and/or incremental data images, as described herein. For recovery procedures, the storage appliance 410-a may write (e.g., export) data to a virtual disk instantiated in association with a virtual machine 420 that is to be recovered. A recovery or export job may be triggered during a virtual machine failover procedure, which may be activated based on a failure of a virtual machine, execution of a test failover procedure, by a replication procedure, or the like. In some cases, the export job may be initiated by a user.

The size of the virtual machine 420 (and associated data) may vary depending on implementation. For example, the size of the virtual machine 420 may range from a few gigabytes to a few terabytes. As such, being able to backup and recovery virtual machines in an efficient manner may be critical for reducing downtime and improving latency in various applications supported by virtual machines 420.

As described herein, the storage appliances 410 may use various data transport modes for reading/writing virtual machine data. A direct-to-host mode is illustrated in FIG. 4A. In some cases, the direct-to-host mode may be referred to a network block device NBD mode. The NBD mode may use secure socket layer (SSL) encryption for security, and may be referred to as NBDSSL. In the direct-to-host mode, the virtual machine host (e.g., ESX host) may read data from the storage (e.g., the virtual machine disk 425-a) of the server 405-a and send it to the backup server (e.g., a backup server 430-a). The backup server 430-a may be an example of a virtual disk development kit (VDDK) server.

In the direct-to-host mode illustrated in FIG. 4A, reading and writing data may be slow to I/O bottlenecks on the virtual machine hosts. That is, the virtual machine hosts (e.g., ESX hosts) may prioritize internal I/O operations (e.g., from applications supported by the virtual machine 420) over external I/O operations, such as read/writes from the storage appliance 410-a. Accordingly, a backup job for the virtual machine 420-a may be slow. When a virtual machine size grows to the terabyte scale, a full backup or export may take hours or days to complete using the direct-to-host mode, which may expose risk of service level agreement non-compliance, downtime of virtual machines 420, and/or increased latency in the virtual machine 420.

A proxy virtual machine data transport mode is illustrated in FIG. 4B. The proxy virtual machine mode may be referred to as HotAdd mode in some implementations. In the proxy virtual machine mode, a backup snapshot generated by a virtual machine appliance (e.g., virtual machine 420) may be used to generate a linked clone of the virtual machine 420-*b* as proxy virtual machine 440. After creation of the proxy virtual machine 440 the virtual disks 425-*b* may be attached to the proxy virtual machine for efficient data transfer (e.g., to the storage appliance 410-*b* from the server 405-*b*) using the backup server 430-*b*. The proxy virtual machine 440 may read/write the data via the locally attached virtual disks 425.

Because the proxy virtual machine 440 may read/write the data via the locally attached virtual disks 425, the proxy virtual machine data transport mode may improve data transfer speed as the proxy virtual machine 440 may backup and/or export local storage. However, using the proxy virtual machine mode may incur more overhead on deploying and managing the proxy virtual machine 440. Further, as described herein, the storage appliance 410 may ingest an entire virtual disk 425 for a first backup of a virtual machine 420, and then continues to ingest data on an incremental basis. Thus, when the difference between two consecutive snapshots is small, the overhead of deploying and managing a proxy virtual machine 440 may be significant.

Thus, techniques described herein support selection, by the storage appliance 410 of either the direct-to-host mode illustrated in FIG. 4A and the proxy virtual machine mode illustrated in FIG. 4B for backup and recovery procedures. The following Table 1 illustrates use jobs and a mode that may be used for each job:

TABLE 1

| | Use-cases | Method |
|---|---|---|
| Backup | Initial full backup | Proxy Virtual Machine |
| | Forced full backup (by users) | Proxy Virtual Machine |
| | Incremental backup | Direct-to-host |
| Recovery | Export | Proxy Virtual Machine |

Thus, depending on the job, the storage appliance 410-*a* may select either the proxy virtual machine mode or the direct-to-host mode. Further, the storage appliance may also consider the size of the job (e.g., relative to a threshold) in determining whether to use the direct-to-host mode or the proxy virtual machine mode. For example, for an initial full backup that is small (e.g., two or three gigabytes), then the direct-to-host mode may be selected for data transfer rather than the proxy virtual machine mode. As another example, if the incremental backup is relatively large, then the proxy virtual machine mode may be selected. In some examples, the threshold size (e.g., in addition to the size of the data to be transferred) that is used to determine whether to select among the modes may be based on the type of job (e.g., backup or recovery), or type of backup (e.g., initial full, forced full, or incremental). For the recovery procedure (e.g., export), the proxy virtual machine mode may be generally selected because the export may include writing an entire virtual disk.

After selection of the mode, the storage appliance 410 may transmit a request to the host of the virtual machine 420 (e.g., a host supported by the server 405), and the request may include parameters to activate the selected data transport mode. In response to the request, and in case of the backup procedure, the storage appliance may receive the data from the virtual machine 420 via the selected and activated data transport mode. The storage appliance 410 may use the received data to create the backup at the storage appliance 410 (e.g., the storage cluster). In the case of the export or recovery procedure, the storage appliance 410 may transmit the data via the selected and activated transport mode to the host of the virtual machine 420.

Figure 5A:
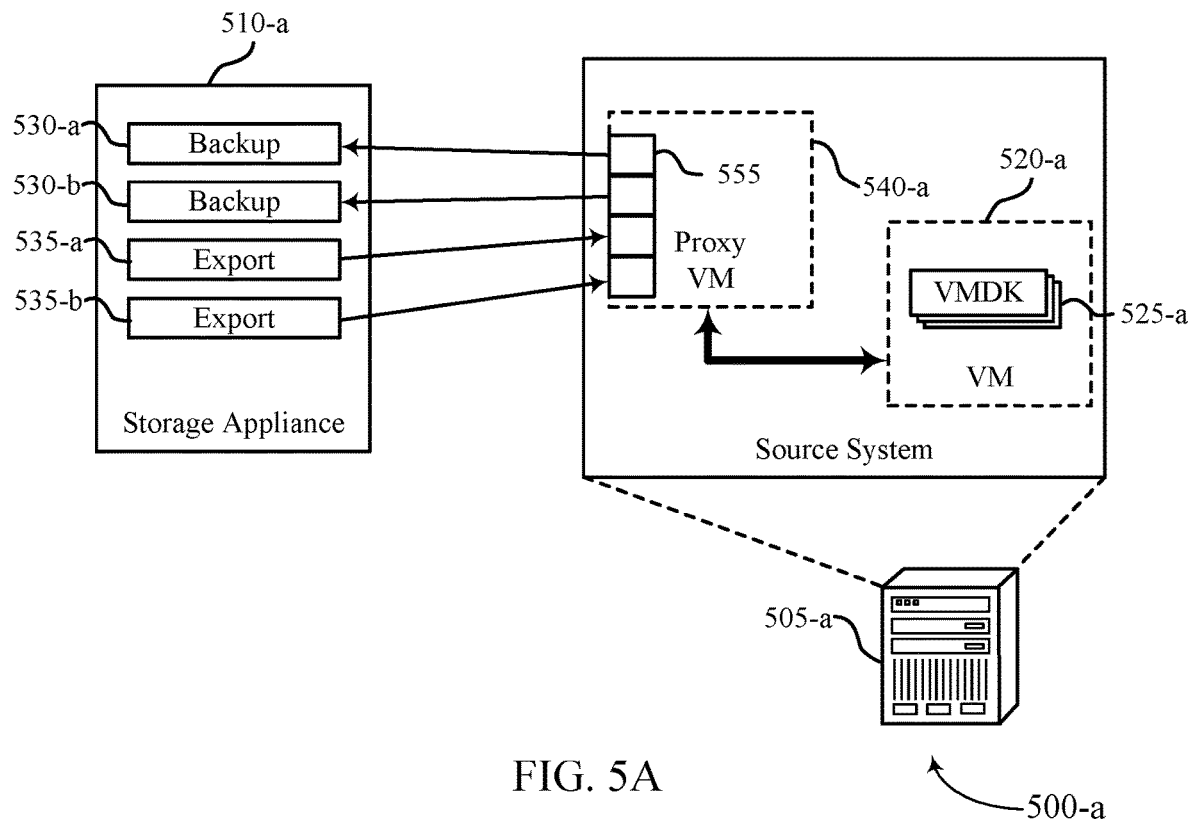
FIG. 5A and FIG. 5B illustrate examples of computing systems that support hybrid data transfer model for virtual machine backup and recovery in accordance with aspects of the present disclosure.
Figure 5B:
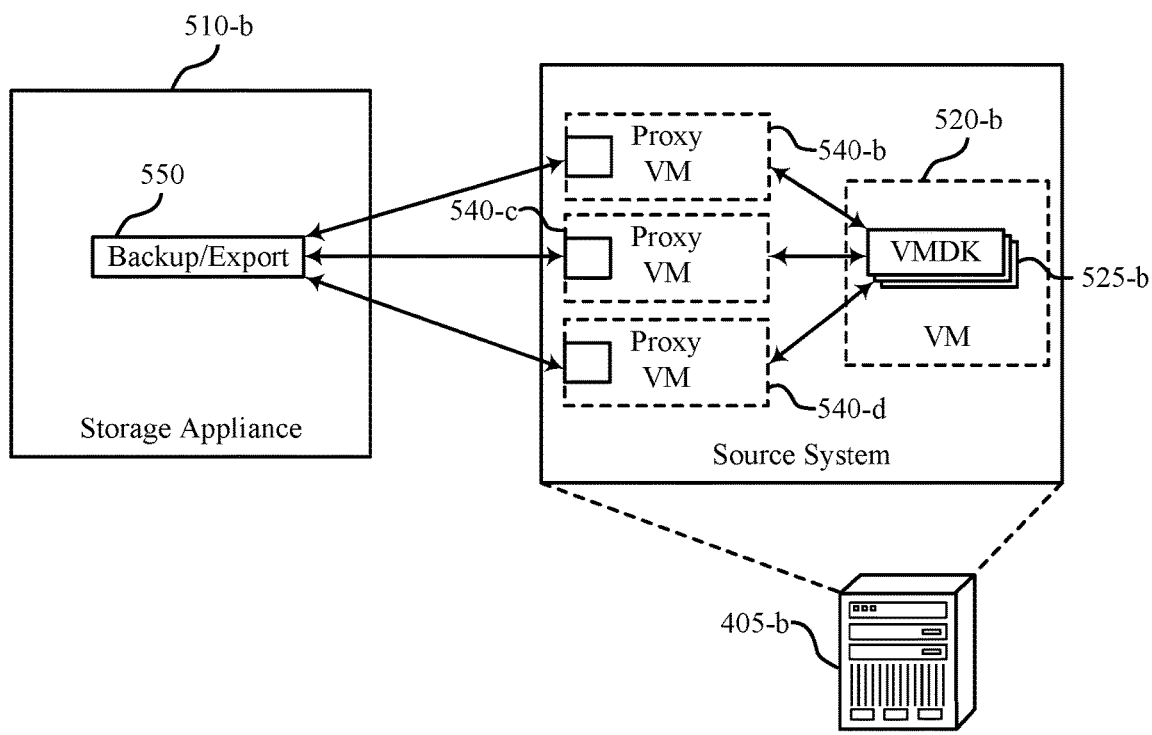

FIG. 5A and FIG. 5B illustrate examples of computing systems 500 that supports hybrid data transfer model for virtual machine backup and recovery in accordance with various aspects of the present disclosure. The computing systems 500-*a* and 500-*b* include servers 505 and storage appliances 510. The server 505 may be an example of a server as described with respect to FIGS. 1 through 4 and may support a system for hosting virtual machines, such as virtual machine 520. The storage appliances 510 may be examples of a storage appliance as described with respect to FIGS. 1 through 4. A described herein, the storage appliances 510 may represent multiple machines and/or nodes of a storage cluster. The storage appliances 510 may support backup and recovery procedures as described herein. For example, the storage appliances 510 may interface with the servers 505 in support of backup and recovery procedures for virtual machines 520 and associated components (e.g., virtual disks 525) supported by the server 505.

FIGS. 5A and 5B illustrate different implementations of utilization of a proxy virtual machine mode for backup and/or recovery of virtual machines. As described herein, the storage appliance 510 may select a data transport mode for reading or writing data associated with virtual machine 520 based on the type of job, the size of the job, or a combination thereof. In the case of selection of the proxy virtual machine mode, the storage appliance 510 may utilize additional techniques such as autoscaling the number of proxy virtual machines and sharing proxy virtual machines among jobs. Further, the storage appliance 510 may use an on-demand proxy virtual machine or a persistent proxy virtual machine for data transport in the proxy virtual machine mode. The following table 2 includes information about the use of an on-demand proxy virtual machine versus using a persistent proxy virtual machine:

TABLE 2

| | | On-demand proxy | Persistent proxy |
|---|---|---|---|
| Definition | | A new proxy virtual machine is deployed only when backup/export runs and is deleted when the job completes. | A proxy virtual machine is deployed prior to any job, and will exist on customer's ESXi hosts even when there is not a current job. |
| Management | Deploy | A new proxy virtual machine is deployed by a (full) backup or export job. | A new proxy virtual machine is typically deployed by the periodic vCenter metadata refresh job. |

TABLE 2-continued

| | On-demand proxy | Persistent proxy |
|---|---|---|
| Manage | There are few management overheads since the proxy only exists when the job runs. | vCenter metadata refresh keeps pinging proxies to ensure they are still alive, and marks them as "expired" if they are no longer reachable. Then a new proxy is redeployed. |
| Upgrade | There is no upgrade-related overheads. Before the upgrade, backup/export uses the old proxy OVA image. And after the upgrade, backup/export uses the new proxy OVA image for deployment. | vCenter metadata refresh keeps track of the current proxy version on the ESX host. If there is a new proxy OVA image, the vCenter metadata refresh puts proxies into maintenance state and upgrade (re-deploy) proxies. |
| Decommission (Expire) | A new proxy virtual machine will be expired by a backup or export once the job finishes transferring virtual disk data. | A proxy virtual machine will exist on a ESX hosts unless being removed manually or being replaced with re-deployment. |

Thus, in some cases, use of the on-demand proxy may have less management overhead, less impact on a virtual machine host (e.g., ESX host), less disruption (e.g., downtime) and caused by a proxy upgrade. However, in some cases, such as when the virtual machines 520 are implemented in a cloud environment, the persistent proxy may be used.

In the case of using the on-demand proxy, the storage appliance 510 may calculate the number of proxy virtual machines 540 that are needed for the job (e.g., backup or export). Next, the storage appliance 510 may deploy the proxy virtual machine image using a tool or utility for virtualization. For example, the storage appliance 510 may deploy the proxy virtual machine open virtualization appliance/application (OVA) image using a VMware open virtualization format (OVF) tool. In some examples, this process may correspond to transmitting a request for the selected data transport mode (e.g., the proxy virtual machine mode) to the host, as described herein. After deploying the proxy virtual machine 540, the data transfer (e.g., read or export) may be initiated using the proxy virtual machine 540. Upon completion of the data transfer, the storage appliance 510 may delete the proxy virtual machines using a centralized management utility of the host.

In some examples, to maximize the usage of the proxy virtual machine 540 and to minimize the impact on the customer's virtual machine host (e.g., ESX host) infrastructure, the proxy virtual machines 540 deployed by a backup/export job may be shared. As illustrated in FIG. 5A, one proxy virtual machine 540-a may be shared between different jobs of the same type for reading/writing data for the virtual machine 520-a. Thus, backup jobs 530-a and 530-b may share the proxy virtual machine 540-a for reading data from virtual disk 525-a supported by server 505-a. Similarly, export jobs 535-a and 535-b may share the proxy virtual machine 540-b for exporting data to the virtual disk 525-a. Additionally or alternatively, the proxy virtual machine 540-a may be shared by different types of jobs. Thus, backup job 530-a and export job 535-a of the storage appliance 510-a may share the proxy virtual machine 540-a for reading data from the virtual disk 525-a (e.g., the backup job 530-a) and exporting data to the virtual disk (e.g., export job 535-a).

Further, as illustrated in FIG. 5B, one job for storage appliance 510-b may use multiple proxy virtual machines 540 for reading/writing data of the virtual disk 525-b for the virtual machine 520-b. Thus, backup/export jobs of large virtual machines 520 may use multiple proxy virtual machines 540 as needed (e.g., based on the number of virtual disk files or number of virtual disks 525-b). As illustrated, backup or export job 550 may use proxy virtual machines 540-b, 530-c, and 540-d for reading/writing data to the virtual disk 525-b. A proxy virtual machine 540 may be limited to a maximum number of child jobs that may be supported at one time. Thus, virtual machine 520 has a large number of virtual disk files, then the backup or export job 550 may be supported by multiple proxy virtual machines 540 as illustrated in FIG. 5B.

In some cases, the storage appliance 510 may calculate a number of proxy virtual machines 540 to use for a particular job or a number of jobs, and the calculation may be based on the size of the job(s) and proxy machine port limitations (e.g., a port 555). In some cases, the number of proxy virtual machines 540 is continuously or periodically scaled by as on current or future workload conditions.

The virtual machine 520 may use one SCSI port when attaching a proxy virtual machine 540, and a SCSI controller may have a maximum of fifteen disks attached. Further, a proxy virtual machine 540 may attach a maximum of four SCSI controllers. Thus, as a proxy virtual machine may attach four SCSI controllers, each with fifteen disks, a proxy virtual machine 540 may support sixty disks. However, to maintain performance, a limit (e.g., fifteen) of proxy ports may be applied per proxy virtual machine 540.

As the storage appliance 510 may be an example of a storage cluster, a single job may be distributed among multiple clusters using child jobs, and each child job may handle a specific shard of the virtual disk data (e.g., virtual disk 525-b). In some cases, a shad may be 500 GB of virtual disk data. However, to limit the impact on the host (e.g., the server 505 or the ESXi host supported by the server 505), the number of current child jobs for a single backup job may be limited. Assuming that the number of current child jobs is set to Y, the number of proxy virtual machines 540 needed for the backup job may be (Y/15)+1. In an example where the size of the virtual disk 525-*b* is 20 TB, the storage appliance 510 may create forty child jobs for the backup job based on each child job handling 500 GB of virtual disk data. Assuming that sixteen child jobs may run in parallel, then the number of proxy virtual machines 540 needed for this backup job may be (16/15)+1=2. When the job starts, two proxy virtual machines 540 may be deployed, and a SCSI port pool with sixteen ports may be created for this backup job. The first proxy virtual machine 540 (e.g., proxy virtual machine 540-*b*) may support jobs 0-13, and the second proxy virtual machine (e.g., proxy virtual machine 540-*c*) may support jobs 14 and 15. When a child job finishes ingesting its shard (e.g., 500 GB) of data, the child job may release the port. In some cases (e.g., if a first child job uses all ports of a proxy virtual machine) a second child job may access one or more ports once released by the first child job (e.g., as those one or more ports become available) and start using those one or more ports to fetch data. In some cases (e.g., if a first child job does not use all ports of a proxy virtual machine), a child job may access another available port of the proxy virtual machine before the first child job releases one or more other ports of the proxy virtual machine. The SCSI port pool may be recycled when the child jobs complete transferring virtual disk data. The jobs may not be distributed evenly across ports proxy virtual machines 540, because other jobs may be accessing the port pool. However, it should be understood that a job may be distributed evenly within the scope of the present disclosure.

A similar technique may be used to distribute work for an export job across multiple data streams. Each virtual disk 525-*b* may use one data stream. The storage appliance 510 may control the number of concurrent streams for a single export job. Assuming that a virtual machine 520 has twenty virtual disks, and that only eight data streams are allowed to run at the same time, then the number of proxy virtual machines that are used to support the job may be (8/15)+1=1. A SCSI port pool with eight available ports may be created and allocated to this export job. When a data stream completes transferring one virtual disk, it may release the SCSI port. Another data stream may then pick up the port and begin transfer data. This process may occur until the data streams complete the data transfer.

Figure 6:
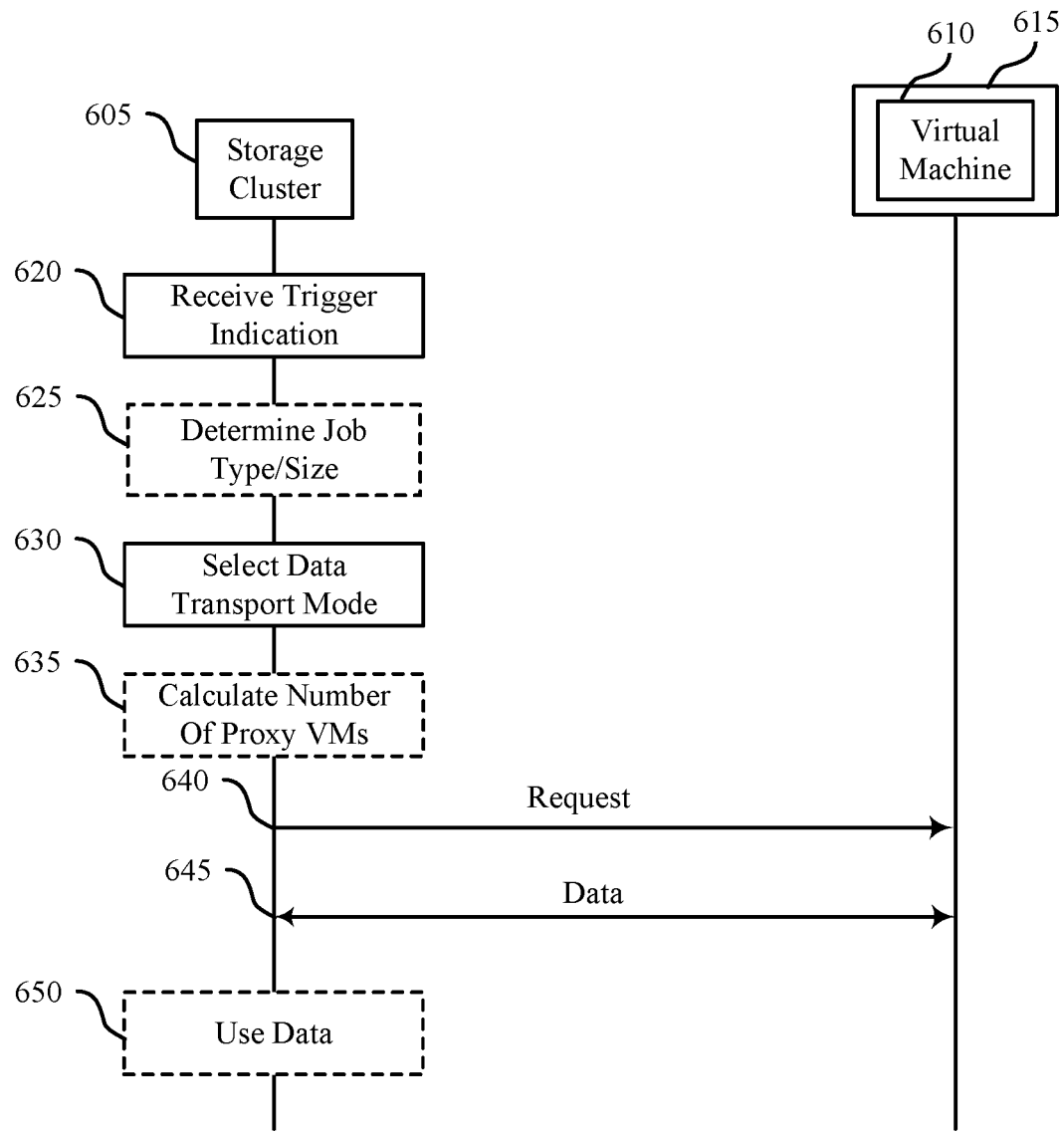
FIG. 6 illustrates an example of a process flow that supports hybrid data transfer model for virtual machine backup and recovery in accordance with aspects of the present disclosure.

FIG. 6 illustrates an example of a process flow 600 that supports hybrid data transfer model for virtual machine backup and recovery in accordance with aspects of the present disclosure. The process flow 600 includes a storage cluster 605, a virtual machine 610, and a virtual machine host 615. The storage cluster 605 may be an example of aspects of a storage appliance as described herein. The virtual machine host 615 may be an example of aspects of a server or various physical and logical components of a server as described herein, and the virtual machine 610 may be an example of other virtual machines described herein.

In some examples, the operations illustrated in the process flow 600 may be performed by hardware (e.g., including circuitry, processing blocks, logic components, and other components), code (e.g., software or firmware) executed by a processor, or any combination thereof. Alternative examples of the following may be implemented, where some operations are performed in a different order than described or are not performed at all. In some cases, operations may include additional features not mentioned below, or further steps may be added.

At 620, the storage cluster 605 may receive a trigger indication to backup or export data of the virtual machine 610. For example, the storage cluster 605 receives a trigger indication to create a backup of the data of the virtual machine 610. In another example, the storage cluster 605 receives a trigger indication to recover the virtual machine 610 at the host 615, which may include exporting the data of the virtual machine 610 to the host 615. The trigger indication may be based on a scheduled backup or recovery procedure, a user initiated backup or recovery procedure, a backup or recovery procedure triggered by a condition (e.g., a storage capacity condition), or a combination thereof.

At 625, the storage cluster 605 may determine the job type, the job size, or both associated with the triggered procedure. For example, the storage cluster 605 may determine that the job is a backup job and whether the backup job is a full backup or incremental backup. Further, the storage cluster 605 may determine the job size, which may be based on the amount of data to be transferred (e.g., imported to or exported from the storage cluster 605). The job size may be determined based on the size of the virtual disk associated with the virtual machine 610 or the change in size of the virtual disk of the virtual machine 610 relative to a previous backup (e.g., for an incremental backup).

In cases where the job is a backup job, at 630, the storage cluster 605 may select, based at least in part on receiving the trigger indication, a data transport mode to use for reading the data from the source virtual machine to create the backup at the storage cluster. The selecting may be from among a set of data transport modes that includes a proxy virtual machine mode and a direct-to-host mode. If the job is a recovery job, the storage cluster 605 may select, based at least in part on receiving the trigger indication, a data transport mode to use for exporting the data from the source virtual machine to the host 615 of the virtual machine 610. The selecting may be from among the set of data transport modes that includes the proxy virtual machine mode and the direct-to-host mode.

In cases where the selected data transport mode is the proxy virtual machine mode for the backup job, at 635, the storage cluster 605 may calculate, based at least in part on selecting the proxy virtual machine mode, a number of proxy virtual machines to use for the backup of the source virtual machine. To calculate the number of proxy virtual machines, the storage cluster 605 may determine a size of a virtual disk corresponding to the source virtual machine, determine a number of child jobs to perform the backup of the source virtual machine based at least in part on the size of the virtual disk, and calculate the number of proxy virtual machines based at least in part on the number of child jobs. The proxy virtual machine may be limited to a maximum number of child jobs based at least in part on a number of ports attachable to the proxy virtual machine, and the number of proxy virtual machines may be calculated based on the maximum number of child jobs. In cases where the job is an export/recovery job, the storage cluster 605 may calculate the number of proxy virtual machines for exporting the data based at least in part on a number of virtual disks corresponding to the second virtual machine, a maximum number of data streams, or a combination thereof.

At 640, the storage cluster 605 may transmit, to the host 615 for the virtual machine 610 and based at least in part on the selected data transport mode, a request to activate the selected data transport mode. In cases where the data transport mode is the proxy virtual machine mode, the storage cluster 605 may request the calculated number of proxy virtual machines. In the direct-to-host mode, the storage cluster 605 may request the data from a centralized management utility associated with the virtual machine 610.

At 645, the data for the virtual machine 610 may be transferred between the storage cluster 605 and the virtual machine 610 according to the selected mode and the job type. For a backup job, the storage cluster 605 may receive, based at least in part on transmitting the request, the data from the virtual machine 610 via the selected data transport mode. In some examples, the data may be received from multiple proxy virtual machines (e.g., when the number of proxy virtual machines is scaled based on the size of the job). Additionally or alternatively, multiple jobs may share a single proxy virtual machine.

At 650, in case of a backup job, the storage cluster 605 may use the data received via the selected data transport mode to create the backup at the storage cluster. In some cases, the storage cluster 605 may store the data for the backup locally. Additionally or alternatively, the data for the backup may be stored in another location (e.g., in cloud storage).

Using the techniques described herein, the time to transfer or fetch data may be reduced. Further, the techniques may support reduced management overhead and reduced impact on host infrastructure. Further, when deploying a proxy virtual machine to support a job for a full backup or export is initiated, the proxy virtual machine may be deleted when the job is completed, which may also reduce host infrastructure impact.

Figure 7:
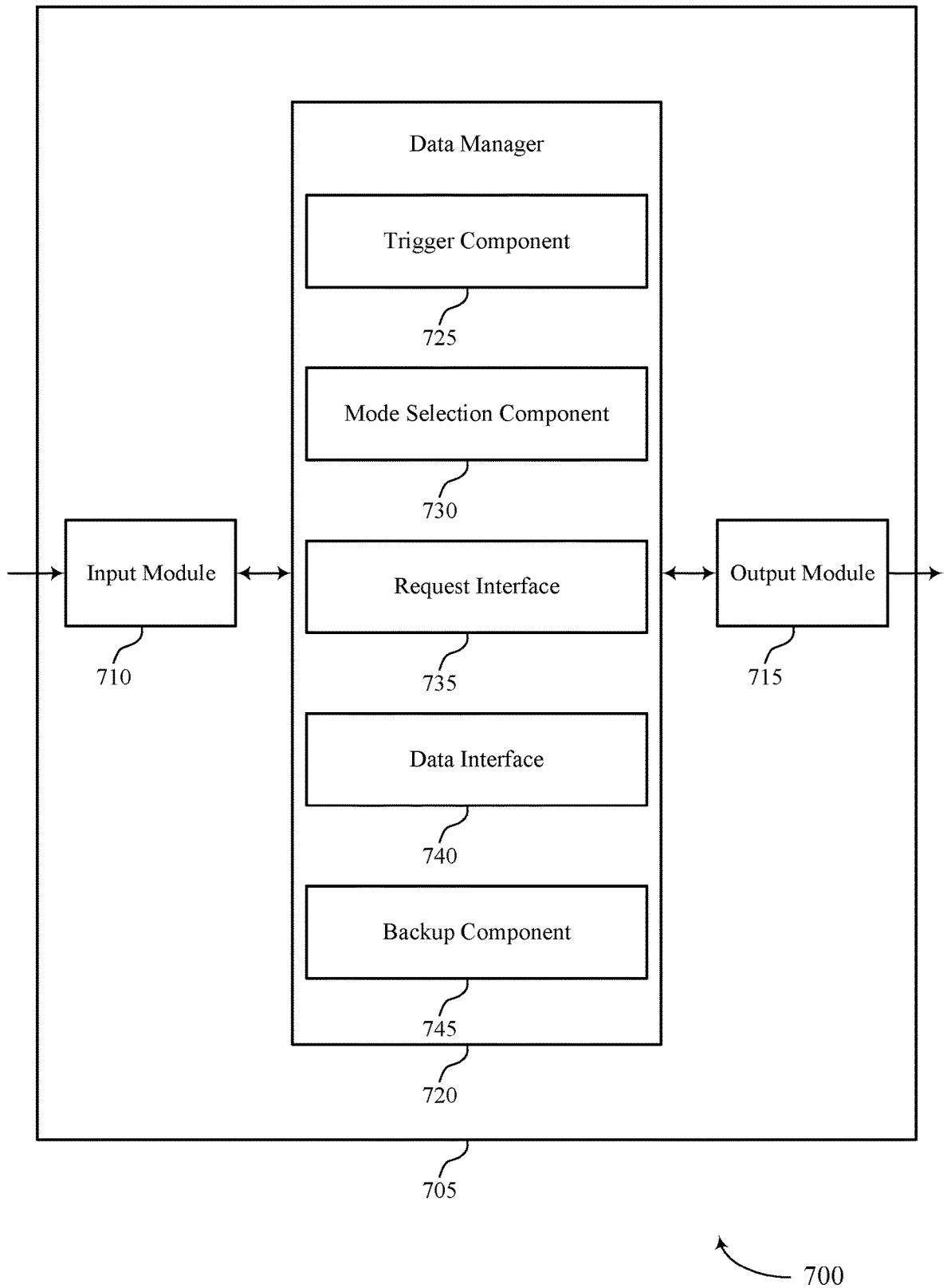
FIG. 7 shows a block diagram of an apparatus that supports hybrid data transfer model for virtual machine backup and recovery in accordance with aspects of the present disclosure.

FIG. 7 shows a block diagram 700 of a device 705 that supports hybrid data transfer model for virtual machine backup and recovery in accordance with aspects of the present disclosure. The device 705 may include an input module 710, an output module 715, and a data manager 720. The device 705 may also include a processor. Each of these components may be in communication with one another (e.g., via one or more buses).

The input module 710 may manage input signals for the device 705. For example, the input module 710 may identify input signals based on an interaction with a modem, a keyboard, a mouse, a touchscreen, or a similar device. These input signals may be associated with user input or processing at other components or devices. In some cases, the input module 710 may utilize an operating system such as iOS®, ANDROID®, MS-DOS®, MS-WINDOWS®, OS/2®, UNIX®, LINUX®, or another known operating system to handle input signals. The input module 710 may send aspects of these input signals to other components of the device 705 for processing. For example, the input module 710 may transmit input signals to the data manager 720 to support hybrid data transfer model for virtual machine backup and recovery. In some cases, the input module 710 may be a component of an network interface 910 as described with reference to FIG. 9.

The output module 715 may manage output signals for the device 705. For example, the output module 715 may receive signals from other components of the device 705, such as the data manager 720, and may transmit these signals to other components or devices. In some examples, the output module 715 may transmit output signals for display in a user interface, for storage in a database or data store, for further processing at a server or server cluster, or for any other processes at any number of devices or systems. In some cases, the output module 715 may be a component of an network interface 910 as described with reference to FIG. 9.

For example, the data manager 720 may include a trigger component 725, a mode selection component 730, a request interface 735, a data interface 740, a backup component 745, or any combination thereof. In some examples, the data manager 720, or various components thereof, may be configured to perform various operations (e.g., receiving, monitoring, transmitting) using or otherwise in cooperation with the input module 710, the output module 715, or both. For example, the data manager 720 may receive information from the input module 710, send information to the output module 715, or be integrated in combination with the input module 710, the output module 715, or both to receive information, transmit information, or perform various other operations as described herein.

The trigger component 725 may be configured as or otherwise support a means for receiving a trigger indication to create, at a storage cluster, a backup of data of a source virtual machine. The mode selection component 730 may be configured as or otherwise support a means for selecting, based on receiving the trigger indication, a data transport mode to use for reading the data from the source virtual machine to create the backup at the storage cluster, the selecting from among a set of data transport modes that includes a proxy virtual machine mode and a direct-to-host mode. The request interface 735 may be configured as or otherwise support a means for transmitting, to a host for the source virtual machine and based on the selected data transport mode, a request to activate the selected data transport mode. The data interface 740 may be configured as or otherwise support a means for receiving, at the storage cluster based on transmitting the request, the data from the source virtual machine via the selected data transport mode. The backup component 745 may be configured as or otherwise support a means for using the data received via the selected data transport mode to create the backup at the storage cluster.

Figure 8:
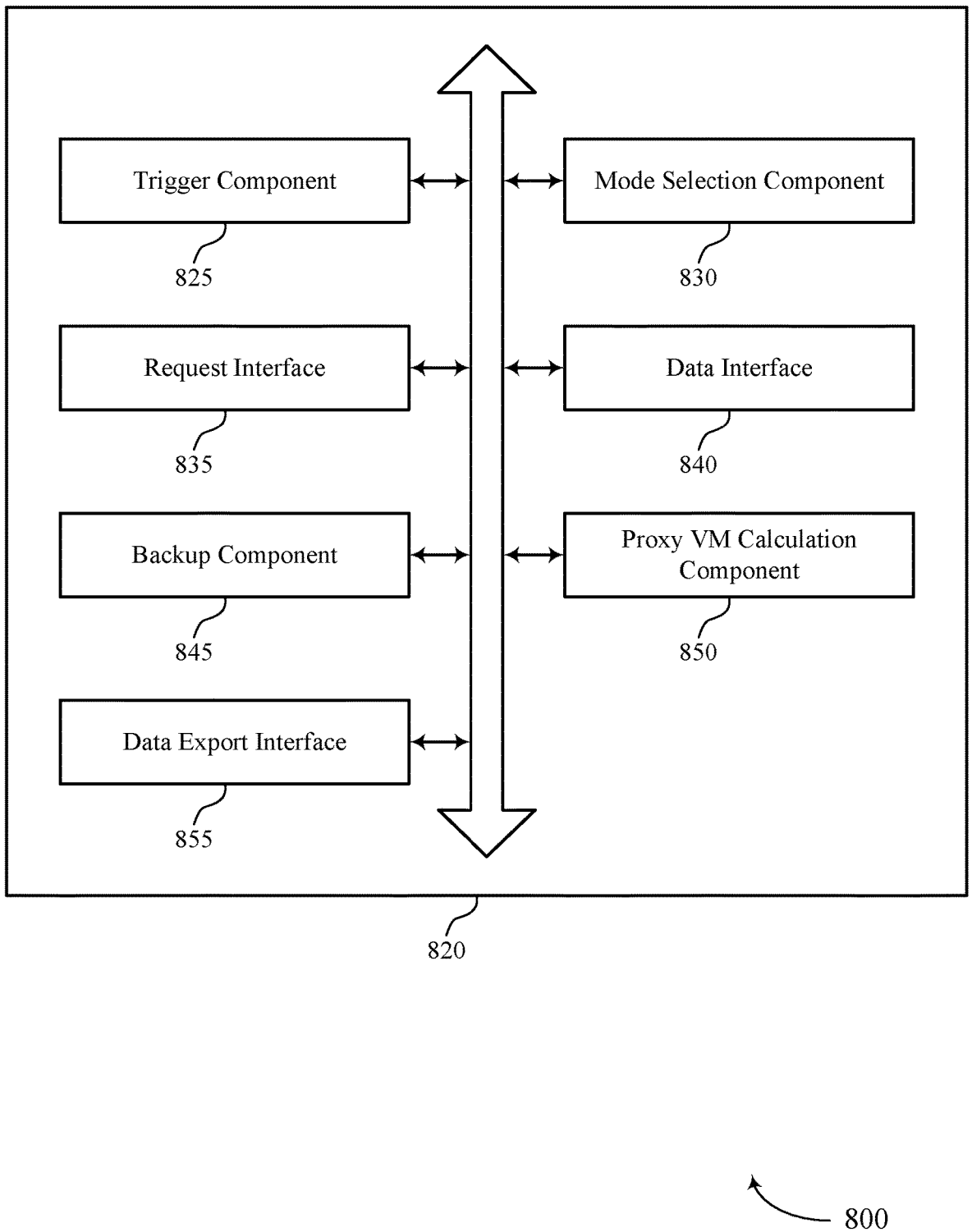
FIG. 8 shows a block diagram of a data manager that supports hybrid data transfer model for virtual machine backup and recovery in accordance with aspects of the present disclosure.

FIG. 8 shows a block diagram 800 of a data manager 820 that supports hybrid data transfer model for virtual machine backup and recovery in accordance with aspects of the present disclosure. The data manager 820 may be an example of aspects of a data manager or a data manager 720, or both, as described herein. The data manager 820, or various components thereof, may be an example of means for performing various aspects of hybrid data transfer model for virtual machine backup and recovery as described herein. For example, the data manager 820 may include a trigger component 825, a mode selection component 830, a request interface 835, a data interface 840, a backup component 845, a proxy VM calculation component 850, a data export interface 855, or any combination thereof. Each of these components may communicate, directly or indirectly, with one another (e.g., via one or more buses).

The trigger component 825 may be configured as or otherwise support a means for receiving a trigger indication to create, at a storage cluster, a backup of data of a source virtual machine. The mode selection component 830 may be configured as or otherwise support a means for selecting, based on receiving the trigger indication, a data transport mode to use for reading the data from the source virtual machine to create the backup at the storage cluster, the selecting from among a set of data transport modes that includes a proxy virtual machine mode and a direct-to-host mode. The request interface 835 may be configured as or otherwise support a means for transmitting, to a host for the source virtual machine and based on the selected data transport mode, a request to activate the selected data transport mode. The data interface 840 may be configured as or otherwise support a means for receiving, at the storage cluster based on transmitting the request, the data from the source virtual machine via the selected data transport mode. The backup component 845 may be configured as or otherwise support a means for using the data received via the selected data transport mode to create the backup at the storage cluster.

In some examples, to support selecting the data transport mode, the mode selection component 830 may be configured as or otherwise support a means for selecting the proxy virtual machine mode based on the backup being a full backup of the source virtual machine, where the data is received from at least one proxy virtual machine based on selecting the proxy virtual machine mode.

In some examples, the backup is the full backup based on the backup being an initial backup of the source virtual machine or based on a user input.

In some examples, to support selecting the data transport mode, the mode selection component 830 may be configured as or otherwise support a means for selecting the data transport mode based on a size of the data to be transferred from the source virtual machine relative to a threshold size.

In some examples, at least one of the size of the data to be transferred or the threshold size is based on whether the backup is a full backup or an incremental backup.

In some examples, to support selecting the data transport mode, the mode selection component 830 may be configured as or otherwise support a means for selecting the direct-to-host mode based on the backup being an incremental backup of the source virtual machine, where the data from the source virtual machine is received via a secure socket layer established by a centralized management utility of the host.

In some examples, the proxy VM calculation component 850 may be configured as or otherwise support a means for calculating, based on selecting the proxy virtual machine mode, a number of proxy virtual machines to use for the backup of the source virtual machine, where the data is received from the source virtual machine via the calculated number of proxy virtual machines.

In some examples, to support calculating the number of proxy virtual machines, the proxy VM calculation component 850 may be configured as or otherwise support a means for determining a size of a virtual disk corresponding to the source virtual machine. In some examples, to support calculating the number of proxy virtual machines, the proxy VM calculation component 850 may be configured as or otherwise support a means for determining a number of child jobs to perform the backup of the source virtual machine based on the size of the virtual disk. In some examples, to support calculating the number of proxy virtual machines, the proxy VM calculation component 850 may be configured as or otherwise support a means for calculating the number of proxy virtual machines based on the number of child jobs.

In some examples, a proxy virtual machine is limited to a maximum number of child jobs based on a number of ports attachable to the proxy virtual machine. In some examples, the number of proxy virtual machines is calculated based on the maximum number of child jobs.

In some examples, to support receiving the data, the data interface 840 may be configured as or otherwise support a means for receiving, via a first child job of the number of child jobs, a first portion of the data from a proxy virtual machine of the number of proxy virtual machines, where the first child job uses a one or more ports of the proxy virtual machine. In some examples, to support receiving the data, the data interface 840 may be configured as or otherwise support a means for receiving, via a second child job of the number of child jobs, a second portion of the data from the proxy virtual machine, where the second child job uses at least one other port of the proxy virtual machine or at least one port of the one or more ports after the first child job releases the at least one port.

In some examples, to support receiving the data, the data interface 840 may be configured as or otherwise support a means for receiving the data from the source virtual machine via at least one proxy virtual machine based on selecting the proxy virtual machine mode and according to a first backup job.

In some examples, the data interface 840 may be configured as or otherwise support a means for receiving additional data from a second source virtual machine via the at least one proxy virtual machine according to a second backup job, where the at least one proxy virtual machine is shared by the first backup job and the second backup job.

In some examples, the data interface 840 may be configured as or otherwise support a means for transmitting, to the host via the at least one proxy virtual machine, data to recover a second source virtual machine at the host according to a recovery job, where the first backup job and the recovery job share the at least one proxy virtual machine.

In some examples, to support receiving the data via the at least one proxy virtual machine, the data interface 840 may be configured as or otherwise support a means for receiving a first portion of the data via a first proxy virtual machine. In some examples, to support receiving the data via the at least one proxy virtual machine, the data interface 840 may be configured as or otherwise support a means for receiving a second portion of the data via a second proxy virtual machine such that the first backup job is allocated to the first proxy virtual machine and the second proxy virtual machine.

In some examples, the data interface 840 may be configured as or otherwise support a means for receiving a second trigger indication to recover a second virtual machine at the host. In some examples, the mode selection component 830 may be configured as or otherwise support a means for selecting, based on receiving the trigger indication to recover the second virtual machine, the proxy virtual machine mode to export data for recovering the second virtual machine. In some examples, the data export interface 855 may be configured as or otherwise support a means for exporting the data for the second virtual machine to the host via at least one proxy virtual machine based on selecting the proxy virtual machine mode.

In some examples, the proxy VM calculation component 850 may be configured as or otherwise support a means for calculating a number of proxy virtual machines for exporting the data based on a number of virtual disks corresponding to the second virtual machine, a maximum number of data streams, or a combination thereof.

In some examples, the mode selection component 830 may be configured as or otherwise support a means for using an on-demand proxy virtual machine or a persistent proxy virtual machine to receive the data from the source virtual machine based on selecting the proxy virtual machine mode.

Figure 9:
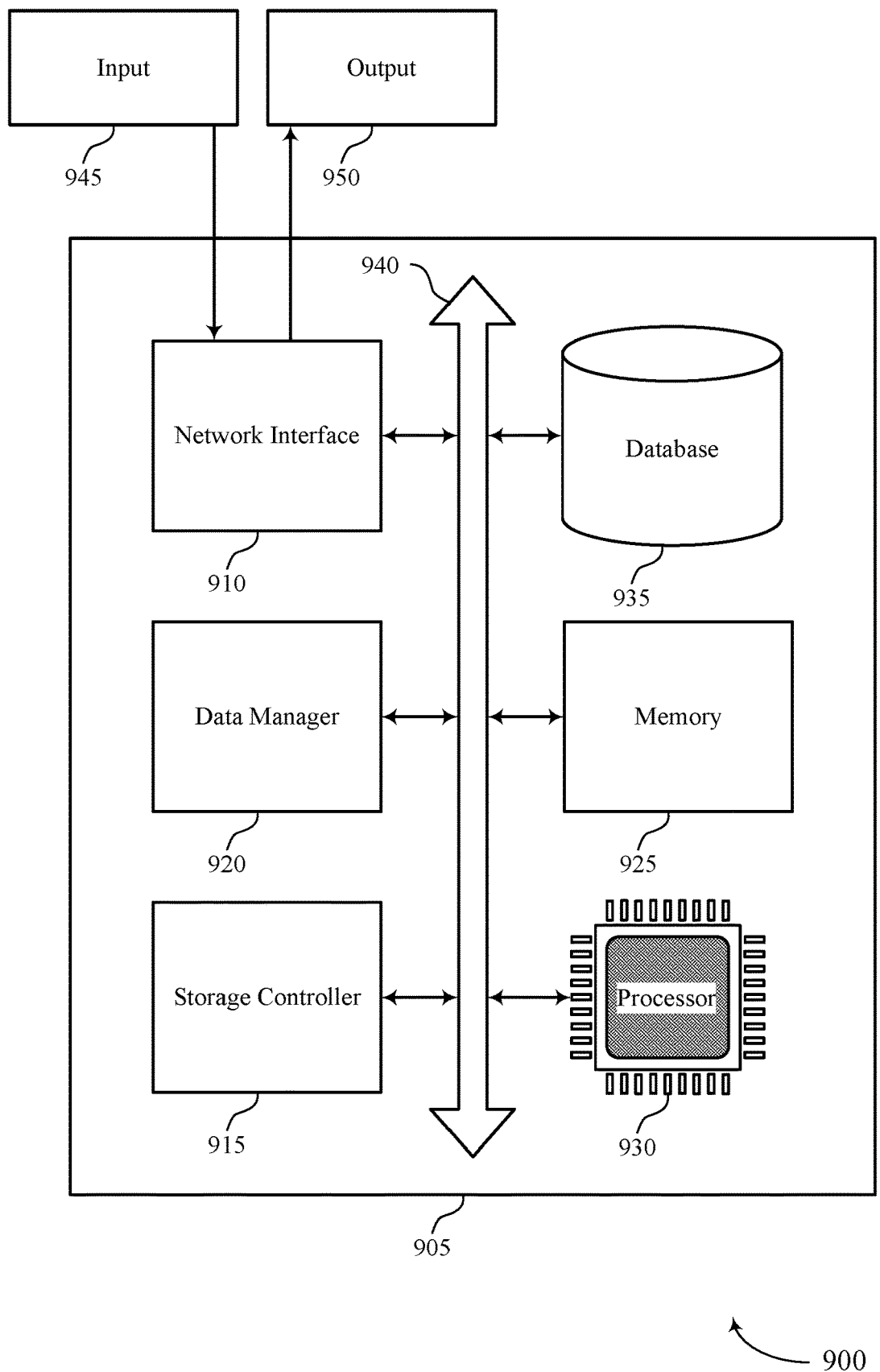
FIG. 9 shows a diagram of a system including a device that supports hybrid data transfer model for virtual machine backup and recovery in accordance with aspects of the present disclosure.

FIG. 9 shows a diagram of a system 900 including a device 905 that supports hybrid data transfer model for virtual machine backup and recovery in accordance with aspects of the present disclosure. The device 905 may be an example of or include the components of a device 705 as described herein. The device 905 may include components for data backup and recovery communications including components for exporting and backing up data, such as a data manager 920, an network interface 910, a storage controller 915, a memory 925, a processor 930, and a database 935. These components may be in electronic communication or otherwise coupled (e.g., operatively, communicatively, functionally, electronically, electrically) via one or more buses (e.g., a bus 940).

The network interface 910 may manage input signals 945 and output signals 950 for the device 905. The network interface 910 may also manage communication with data sources not integrated into the device 905. In some cases, the network interface 910 may represent a physical connection, a wired connection, a wireless connection, or port to an external peripheral. In some cases, the network interface 910 may utilize an operating system such as iOS®, ANDROID®, MS-DOS®, MS-WINDOWS®, OS/2®, UNIX®, LINUX®, or another known operating system. In other cases, the network interface 910 may represent or interact with a one or more data sources (e.g., servers, data storage appliances, databases, cloud storage systems) or one or more devices or peripherals such as a modem, a keyboard, a mouse, a touchscreen, or a similar device. In some cases, the network interface 910 may be implemented as part of a processor 930. In some examples, a user may interact with the device 905 via the network interface 910 or via hardware components controlled by the network interface 910.

The storage controller 915 may manage data storage and processing in a database 935. In some cases, a user may interact with the storage controller 915. In other cases, the storage controller 915 may operate automatically without user interaction. The database 935 may be an example of a single database, a distributed database, multiple distributed databases, a data store, a data lake, or an emergency backup database.

Memory 925 may include random-access memory (RAM) and ROM. The memory 925 may store computer-readable, computer-executable software including instructions that, when executed, cause the processor 930 to perform various functions described herein. In some cases, the memory 925 may contain, among other things, a BIOS which may control basic hardware or software operation such as the interaction with peripheral components or devices.

The processor 930 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 930 may be configured to operate a memory array using a memory controller. In other cases, a memory controller may be integrated into the processor 930. The processor 930 may be configured to execute computer-readable instructions stored in a memory 925 to perform various functions (e.g., functions or tasks supporting hybrid data transfer model for virtual machine backup and recovery).

For example, the data manager 920 may be configured as or otherwise support a means for receiving a trigger indication to create, at a storage cluster, a backup of data of a source virtual machine. The data manager 920 may be configured as or otherwise support a means for selecting, based on receiving the trigger indication, a data transport mode to use for reading the data from the source virtual machine to create the backup at the storage cluster, the selecting from among a set of data transport modes that includes a proxy virtual machine mode and a direct-to-host mode. The data manager 920 may be configured as or otherwise support a means for transmitting, to a host for the source virtual machine and based on the selected data transport mode, a request to activate the selected data transport mode. The data manager 920 may be configured as or otherwise support a means for receiving, at the storage cluster based on transmitting the request, the data from the source virtual machine via the selected data transport mode. The data manager 920 may be configured as or otherwise support a means for using the data received via the selected data transport mode to create the backup at the storage cluster.

Figure 10:
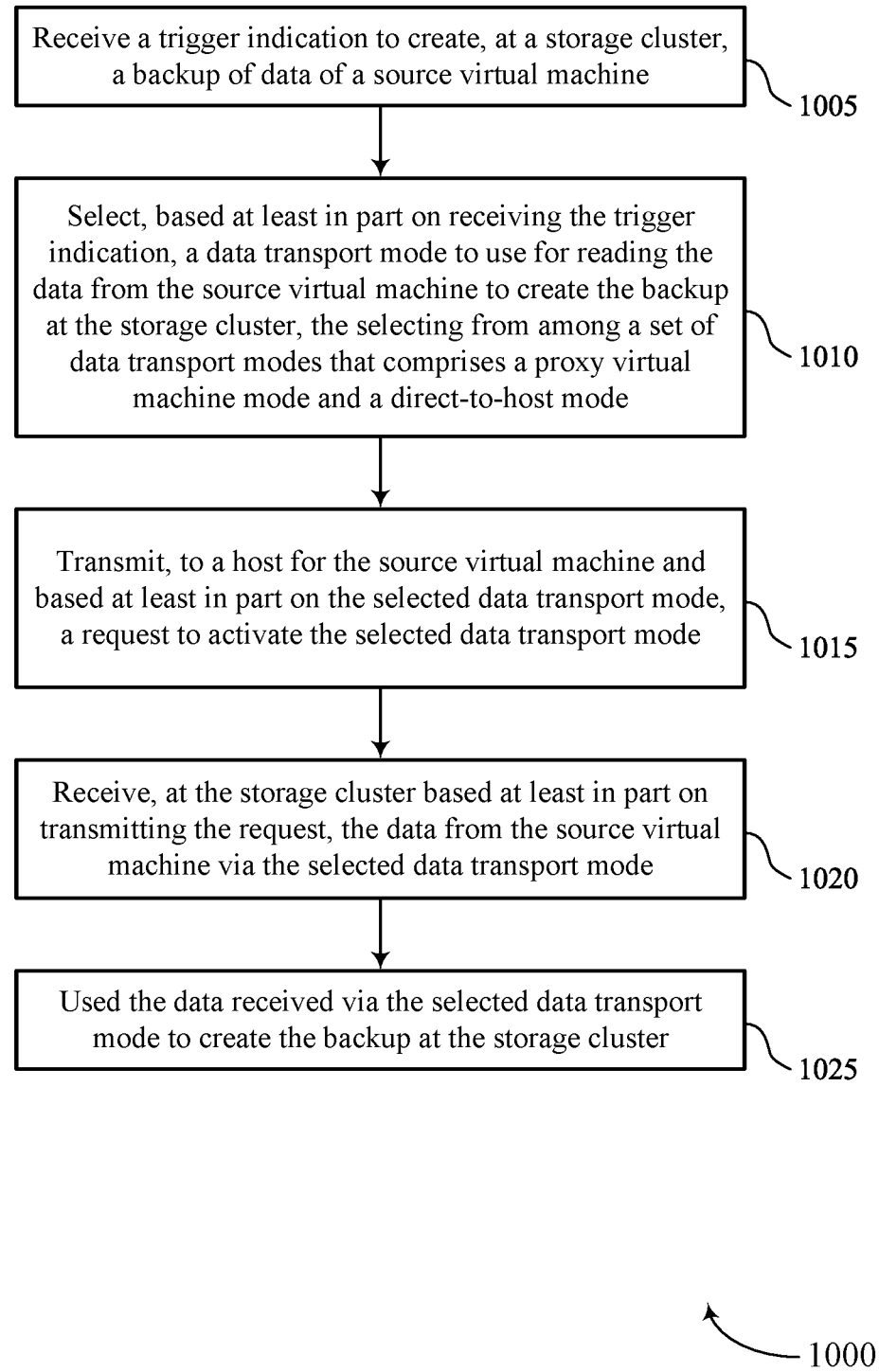
FIGS. 10 through 13 show flowcharts illustrating methods that support hybrid data transfer model for virtual machine backup and recovery in accordance with aspects of the present disclosure.

FIG. 10 shows a flowchart illustrating a method 1000 that supports hybrid data transfer model for virtual machine backup and recovery in accordance with aspects of the present disclosure. The operations of the method 1000 may be implemented by a storage appliance or its components as described herein. For example, the operations of the method 1000 may be performed by a storage appliance as described with reference to FIGS. 1 through 9. In some examples, a storage appliance may execute a set of instructions to control the functional elements of the storage appliance to perform the described functions. Additionally, or alternatively, the storage appliance may perform aspects of the described functions using special-purpose hardware.

At 1005, the method may include receiving a trigger indication to create, at a storage cluster, a backup of data of a source virtual machine. The operations of 1005 may be performed in accordance with examples as disclosed herein. In some examples, aspects of the operations of 1005 may be performed by a trigger component 825 as described with reference to FIG. 8.

At 1010, the method may include selecting, based on receiving the trigger indication, a data transport mode to use for reading the data from the source virtual machine to create the backup at the storage cluster, the selecting from among a set of data transport modes that includes a proxy virtual machine mode and a direct-to-host mode. The operations of 1010 may be performed in accordance with examples as disclosed herein. In some examples, aspects of the operations of 1010 may be performed by a mode selection component 830 as described with reference to FIG. 8.

At 1015, the method may include transmitting, to a host for the source virtual machine and based on the selected data transport mode, a request to activate the selected data transport mode. The operations of 1015 may be performed in accordance with examples as disclosed herein. In some examples, aspects of the operations of 1015 may be performed by a request interface 835 as described with reference to FIG. 8.

At 1020, the method may include receiving, at the storage cluster based on transmitting the request, the data from the source virtual machine via the selected data transport mode. The operations of 1020 may be performed in accordance with examples as disclosed herein. In some examples, aspects of the operations of 1020 may be performed by a data interface 840 as described with reference to FIG. 8.

At 1025, the method may include using the data received via the selected data transport mode to create the backup at the storage cluster. The operations of 1025 may be performed in accordance with examples as disclosed herein. In some examples, aspects of the operations of 1025 may be performed by a backup component 845 as described with reference to FIG. 8.

Figure 11:
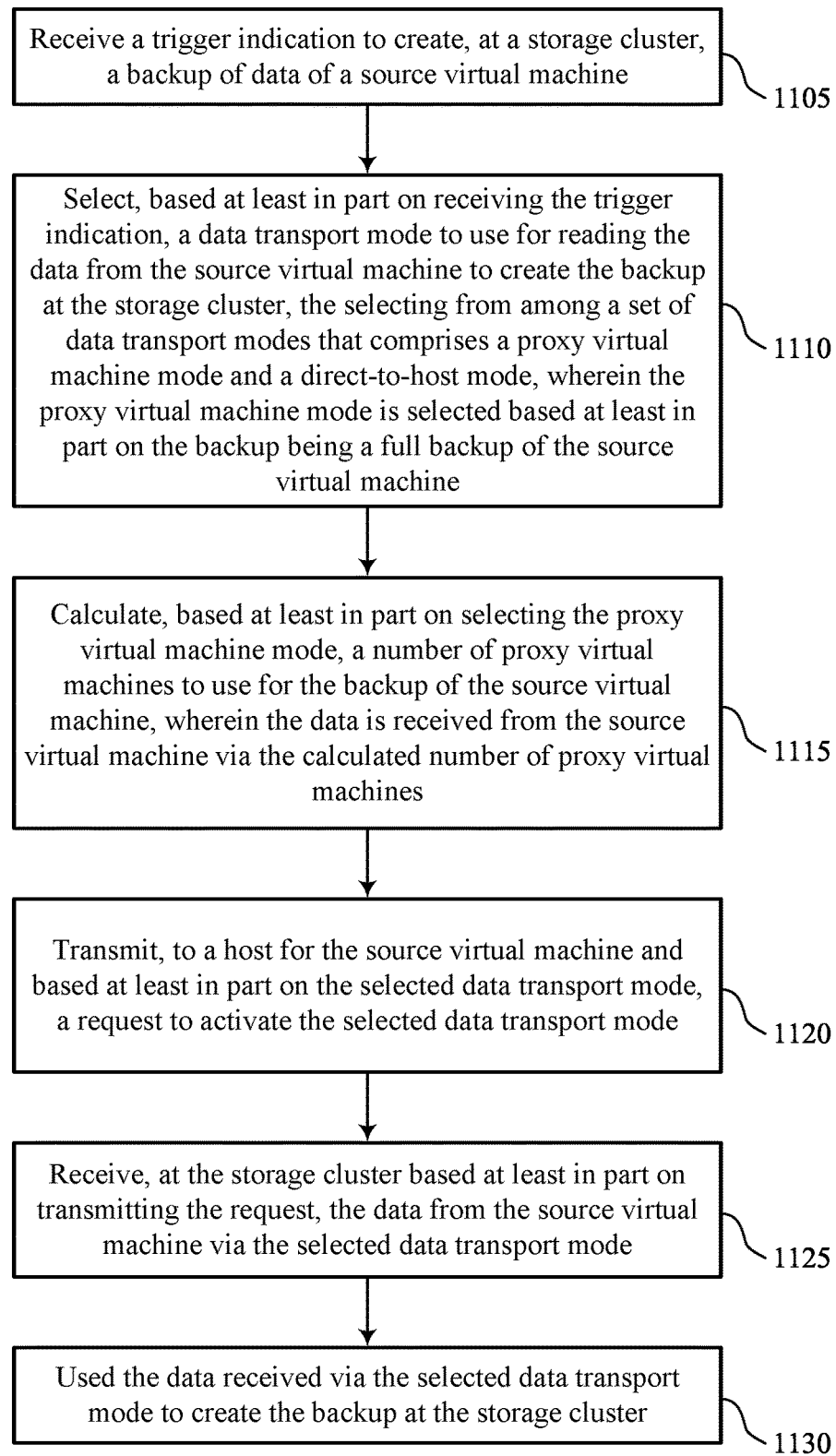

FIG. 11 shows a flowchart illustrating a method 1100 that supports hybrid data transfer model for virtual machine backup and recovery in accordance with aspects of the present disclosure. The operations of the method 1100 may be implemented by a storage appliance or its components as described herein. For example, the operations of the method 1100 may be performed by a storage appliance as described with reference to FIGS. 1 through 9. In some examples, a storage appliance may execute a set of instructions to control the functional elements of the storage appliance to perform the described functions. Additionally, or alternatively, the storage appliance may perform aspects of the described functions using special-purpose hardware.

At 1105, the method may include receiving a trigger indication to create, at a storage cluster, a backup of data of a source virtual machine. The operations of 1105 may be performed in accordance with examples as disclosed herein. In some examples, aspects of the operations of 1105 may be performed by a trigger component 825 as described with reference to FIG. 8.

At 1110, the method may include selecting, based on receiving the trigger indication, a data transport mode to use for reading the data from the source virtual machine to create the backup at the storage cluster, the selecting from among a set of data transport modes that includes a proxy virtual machine mode and a direct-to-host mode, wherein the proxy virtual machine mode is selected based at least in part on the backup being a full backup of the source virtual machine. The operations of 1110 may be performed in accordance with examples as disclosed herein. In some examples, aspects of the operations of 1110 may be performed by a mode selection component 830 as described with reference to FIG. 8.

At 1115, the method may include calculating, based on selecting the proxy virtual machine mode, a number of proxy virtual machines to use for the backup of the source virtual machine, where the data is received from the source virtual machine via the calculated number of proxy virtual machines. The operations of 1115 may be performed in accordance with examples as disclosed herein. In some examples, aspects of the operations of 1115 may be performed by a proxy VM calculation component 850 as described with reference to FIG. 8.

At 1120, the method may include transmitting, to a host for the source virtual machine and based on the selected data transport mode, a request to activate the selected data transport mode. The operations of 1120 may be performed in accordance with examples as disclosed herein. In some examples, aspects of the operations of 1120 may be performed by a request interface 835 as described with reference to FIG. 8.

At 1125, the method may include receiving, at the storage cluster based on transmitting the request, the data from the source virtual machine via the selected data transport mode. The operations of 1125 may be performed in accordance with examples as disclosed herein. In some examples, aspects of the operations of 1125 may be performed by a data interface 840 as described with reference to FIG. 8.

At 1130, the method may include using the data received via the selected data transport mode to create the backup at the storage cluster. The operations of 1130 may be performed in accordance with examples as disclosed herein. In some examples, aspects of the operations of 1130 may be performed by a backup component 845 as described with reference to FIG. 8.

Figure 12:
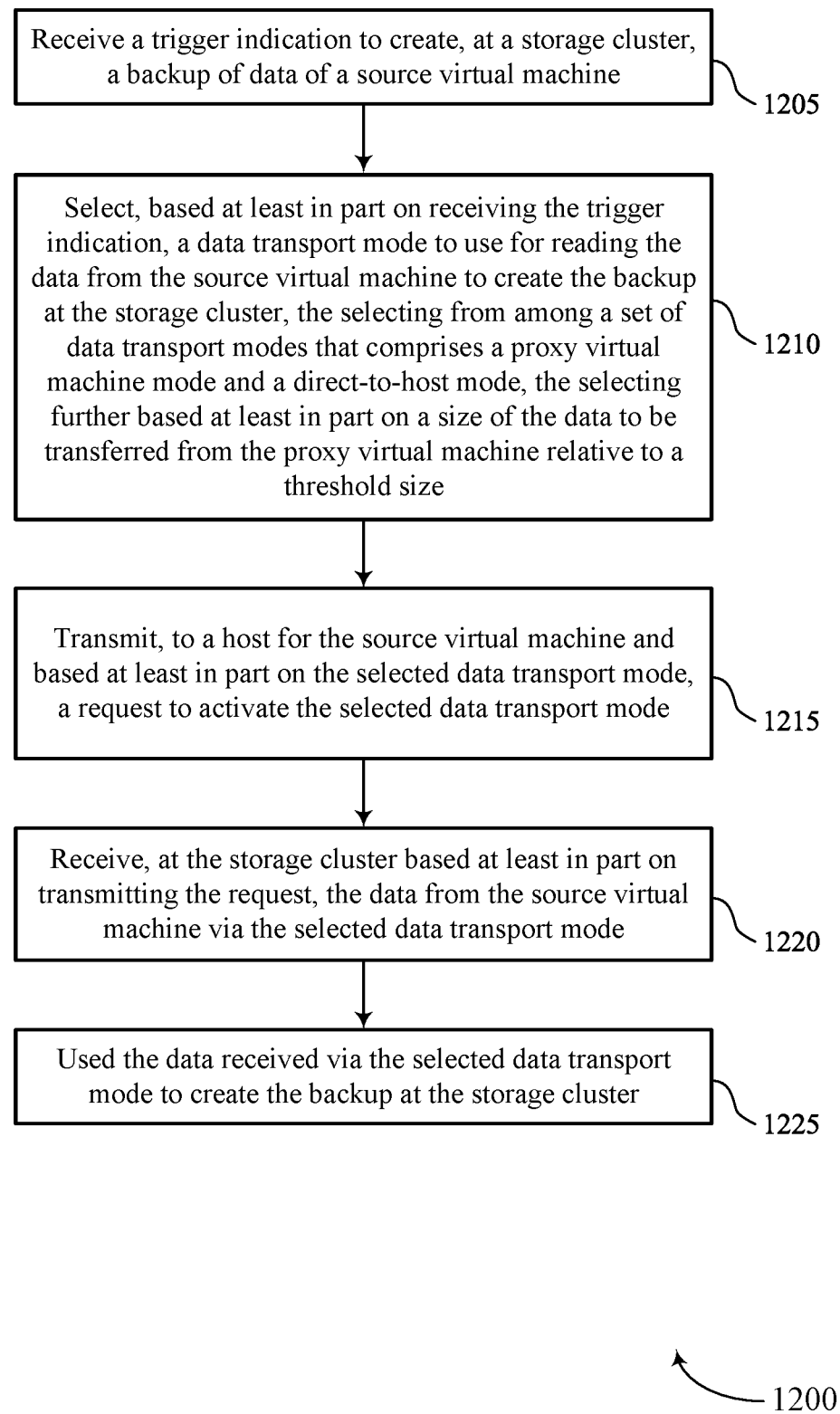

FIG. 12 shows a flowchart illustrating a method 1200 that supports hybrid data transfer model for virtual machine backup and recovery in accordance with aspects of the present disclosure. The operations of the method 1200 may be implemented by a storage appliance or its components as described herein. For example, the operations of the method 1200 may be performed by a storage appliance as described with reference to FIGS. 1 through 9. In some examples, a storage appliance may execute a set of instructions to control the functional elements of the storage appliance to perform the described functions. Additionally, or alternatively, the storage appliance may perform aspects of the described functions using special-purpose hardware.

At 1205, the method may include receiving a trigger indication to create, at a storage cluster, a backup of data of a source virtual machine. The operations of 1205 may be performed in accordance with examples as disclosed herein. In some examples, aspects of the operations of 1205 may be performed by a trigger component 825 as described with reference to FIG. 8.

At 1210, the method may include selecting, based on receiving the trigger indication, a data transport mode to use for reading the data from the source virtual machine to create the backup at the storage cluster, the selecting from among a set of data transport modes that includes a proxy virtual machine mode and a direct-to-host mode, the selecting further based on a size of the data to be transferred from the source virtual machine relative to a threshold size. The operations of 1210 may be performed in accordance with examples as disclosed herein. In some examples, aspects of the operations of 1210 may be performed by a mode selection component 830 as described with reference to FIG. 8.

At 1215, the method may include transmitting, to a host for the source virtual machine and based on the selected data transport mode, a request to activate the selected data transport mode. The operations of 1215 may be performed in accordance with examples as disclosed herein. In some examples, aspects of the operations of 1215 may be performed by a request interface 835 as described with reference to FIG. 8.

At 1220, the method may include receiving, at the storage cluster based on transmitting the request, the data from the source virtual machine via the selected data transport mode. The operations of 1220 may be performed in accordance with examples as disclosed herein. In some examples, aspects of the operations of 1220 may be performed by a data interface 840 as described with reference to FIG. 8.

At 1225, the method may include using the data received via the selected data transport mode to create the backup at the storage cluster. The operations of 1225 may be performed in accordance with examples as disclosed herein. In some examples, aspects of the operations of 1225 may be performed by a backup component 845 as described with reference to FIG. 8.

Figure 13:
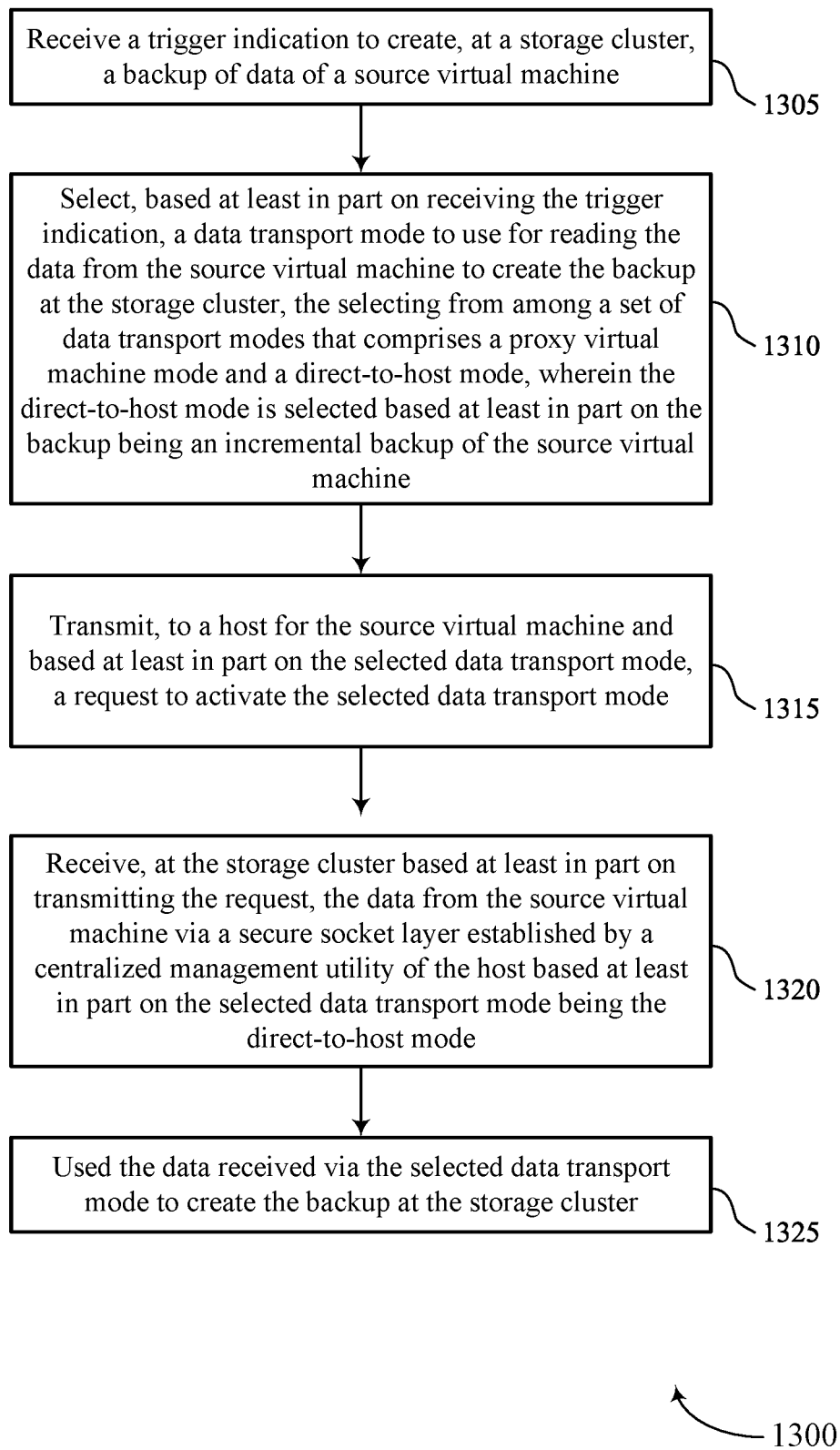

FIG. 13 shows a flowchart illustrating a method 1300 that supports hybrid data transfer model for virtual machine backup and recovery in accordance with aspects of the present disclosure. The operations of the method 1300 may be implemented by a storage appliance or its components as described herein. For example, the operations of the method 1300 may be performed by a storage appliance as described with reference to FIGS. 1 through 9. In some examples, a storage appliance may execute a set of instructions to control the functional elements of the storage appliance to perform the described functions. Additionally, or alternatively, the storage appliance may perform aspects of the described functions using special-purpose hardware.

At 1305, the method may include receiving a trigger indication to create, at a storage cluster, a backup of data of a source virtual machine. The operations of 1305 may be performed in accordance with examples as disclosed herein. In some examples, aspects of the operations of 1305 may be performed by a trigger component 825 as described with reference to FIG. 8.

At 1310, the method may include selecting, based on receiving the trigger indication, a data transport mode to use for reading the data from the source virtual machine to create the backup at the storage cluster, the selecting from among a set of data transport modes that includes a proxy virtual machine mode and a direct-to-host mode, wherein the direct-to-host mode is selected based on the backup being an incremental backup of the source virtual machine. The operations of 1310 may be performed in accordance with examples as disclosed herein. In some examples, aspects of the operations of 1310 may be performed by a mode selection component 830 as described with reference to FIG. 8.

At 1315, the method may include transmitting, to a host for the source virtual machine and based on the selected data transport mode, a request to activate the selected data transport mode. The operations of 1315 may be performed in accordance with examples as disclosed herein. In some examples, aspects of the operations of 1315 may be performed by a request interface 835 as described with reference to FIG. 8.

At 1320, the method may include receiving, at the storage cluster based on transmitting the request, the data from the source virtual machine via a secure socket layer established by a centralized management utility of the host based at least in part on the selected data transport mode being the direct-to-host mode. The operations of 1320 may be performed in accordance with examples as disclosed herein. In some examples, aspects of the operations of 1320 may be performed by a data interface 840 as described with reference to FIG. 8.

At 1325, the method may include using the data received via the selected data transport mode to create the backup at the storage cluster. The operations of 1325 may be performed in accordance with examples as disclosed herein. In some examples, aspects of the operations of 1325 may be performed by a backup component 845 as described with reference to FIG. 8.

A method is described. The method may include receiving a trigger indication to create, at a storage cluster, a backup of data of a source virtual machine, selecting, based on receiving the trigger indication, a data transport mode to use for reading the data from the source virtual machine to create the backup at the storage cluster, the selecting from among a set of data transport modes that includes a proxy virtual machine mode and a direct-to-host mode, transmitting, to a host for the source virtual machine and based on the selected data transport mode, a request to activate the selected data transport mode, receiving, at the storage cluster based on transmitting the request, the data from the source virtual machine via the selected data transport mode, and using the data received via the selected data transport mode to create the backup at the storage cluster.

An apparatus is described. The apparatus may include a processor, memory coupled with the processor, and instructions stored in the memory. The instructions may be executable by the processor to cause the apparatus to receive a trigger indication to create, at a storage cluster, a backup of data of a source virtual machine, select, based on receiving the trigger indication, a data transport mode to use for reading the data from the source virtual machine to create the backup at the storage cluster, the selecting from among a set of data transport modes that includes a proxy virtual machine mode and a direct-to-host mode, transmit, to a host for the source virtual machine and based on the selected data transport mode, a request to activate the selected data transport mode, receive, at the storage cluster based on transmitting the request, the data from the source virtual machine via the selected data transport mode, and used the data received via the selected data transport mode to create the backup at the storage cluster.

Another apparatus is described. The apparatus may include means for receiving a trigger indication to create, at a storage cluster, a backup of data of a source virtual machine, means for selecting, based on receiving the trigger indication, a data transport mode to use for reading the data from the source virtual machine to create the backup at the storage cluster, the selecting from among a set of data transport modes that includes a proxy virtual machine mode and a direct-to-host mode, means for transmitting, to a host for the source virtual machine and based on the selected data transport mode, a request to activate the selected data transport mode, means for receiving, at the storage cluster based on transmitting the request, the data from the source virtual machine via the selected data transport mode, and means for using the data received via the selected data transport mode to create the backup at the storage cluster.

A non-transitory computer-readable medium storing code is described. The code may include instructions executable by a processor to receive a trigger indication to create, at a storage cluster, a backup of data of a source virtual machine, select, based on receiving the trigger indication, a data transport mode to use for reading the data from the source virtual machine to create the backup at the storage cluster, the selecting from among a set of data transport modes that includes a proxy virtual machine mode and a direct-to-host mode, transmit, to a host for the source virtual machine and based on the selected data transport mode, a request to activate the selected data transport mode, receive, at the storage cluster based on transmitting the request, the data from the source virtual machine via the selected data transport mode, and used the data received via the selected data transport mode to create the backup at the storage cluster.

In some examples of the method, apparatuses, and non-transitory computer-readable medium described herein, operations, features, means, or instructions for selecting the data transport mode may include operations, features, means, or instructions for selecting the proxy virtual machine mode based on the backup being a full backup of the source virtual machine, where the data may be received from at least one proxy virtual machine based on selecting the proxy virtual machine mode.

In some examples of the method, apparatuses, and non-transitory computer-readable medium described herein, the backup may be the full backup based on the backup being an initial backup of the source virtual machine or based on a user input.

In some examples of the method, apparatuses, and non-transitory computer-readable medium described herein, operations, features, means, or instructions for selecting the data transport mode may include operations, features, means, or instructions for selecting the data transport mode based on a size of the data to be transferred from the source virtual machine relative to a threshold size.

In some examples of the method, apparatuses, and non-transitory computer-readable medium described herein, at least one of the size of the data to be transferred or the threshold size may be based on whether the backup may be a full backup or an incremental backup.

In some examples of the method, apparatuses, and non-transitory computer-readable medium described herein, operations, features, means, or instructions for selecting the data transport mode may include operations, features, means, or instructions for selecting the direct-to-host mode based on the backup being an incremental backup of the source virtual machine, where the data from the source virtual machine may be received via a secure socket layer established by a centralized management utility of the host.

Some examples of the method, apparatuses, and non-transitory computer-readable medium described herein may further include operations, features, means, or instructions for calculating, based on selecting the proxy virtual machine mode, a number of proxy virtual machines to use for the backup of the source virtual machine, where the data may be received from the source virtual machine via the calculated number of proxy virtual machines.

In some examples of the method, apparatuses, and non-transitory computer-readable medium described herein, operations, features, means, or instructions for calculating the number of proxy virtual machines may include operations, features, means, or instructions for determining a size of a virtual disk corresponding to the source virtual machine, determining a number of child jobs to perform the backup of the source virtual machine based on the size of the virtual disk, and calculating the number of proxy virtual machines based on the number of child jobs.

In some examples of the method, apparatuses, and non-transitory computer-readable medium described herein, a proxy virtual machine may be limited to a maximum number of child jobs based on a number of ports attachable to the proxy virtual machine and the number of proxy virtual machines may be calculated based on the maximum number of child jobs.

In some examples of the method, apparatuses, and non-transitory computer-readable medium described herein, operations, features, means, or instructions for receiving the data may include operations, features, means, or instructions for receiving, via a first child job of the number of child jobs, a first portion of the data from a proxy virtual machine of the number of proxy virtual machines, where the first child job uses a one or more ports of the proxy virtual machine, and receiving, via a second child job of the number of child jobs, a second portion of the data from the proxy virtual machine, where the second child job uses at least one other port of the proxy virtual machine or at least one port of the one or more ports after the first child job releases the at least one port.

In some examples of the method, apparatuses, and non-transitory computer-readable medium described herein, operations, features, means, or instructions for receiving the data may include operations, features, means, or instructions for receiving the data from the source virtual machine via at least one proxy virtual machine based on selecting the proxy virtual machine mode and according to a first backup job.

Some examples of the method, apparatuses, and non-transitory computer-readable medium described herein may further include operations, features, means, or instructions for receiving additional data from a second source virtual machine via the at least one proxy virtual machine according to a second backup job, where the at least one proxy virtual machine may be shared by the first backup job and the second backup job.

Some examples of the method, apparatuses, and non-transitory computer-readable medium described herein may further include operations, features, means, or instructions for transmitting, to the host via the at least one proxy virtual machine, data to recover a second source virtual machine at the host according to a recovery job, where the first backup job and the recovery job share the at least one proxy virtual machine.

In some examples of the method, apparatuses, and non-transitory computer-readable medium described herein, operations, features, means, or instructions for receiving the data via the at least one proxy virtual machine may include operations, features, means, or instructions for receiving a first portion of the data via a first proxy virtual machine and receiving a second portion of the data via a second proxy virtual machine such that the first backup job may be allocated to the first proxy virtual machine and the second proxy virtual machine.

Some examples of the method, apparatuses, and non-transitory computer-readable medium described herein may further include operations, features, means, or instructions for receiving a second trigger indication to recover a second virtual machine at the host, selecting, based on receiving the trigger indication to recover the second virtual machine, the proxy virtual machine mode to export data for recovering the second virtual machine, and exporting the data for the second virtual machine to the host via at least one proxy virtual machine based on selecting the proxy virtual machine mode.

Some examples of the method, apparatuses, and non-transitory computer-readable medium described herein may further include operations, features, means, or instructions for calculating a number of proxy virtual machines for exporting the data based on a number of virtual disks corresponding to the second virtual machine, a maximum number of data streams, or a combination thereof.

Some examples of the method, apparatuses, and non-transitory computer-readable medium described herein may further include operations, features, means, or instructions for using an on-demand proxy virtual machine or a persistent proxy virtual machine to receive the data from the source virtual machine based on selecting the proxy virtual machine mode.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
    receiving a trigger indication to create, at a storage cluster, a backup of data of a source virtual machine;
    selecting, after receiving the trigger indication, a data transport mode to use for reading the data from the source virtual machine to create the backup at the storage cluster, wherein the selecting is from among a set of data transport modes that comprises a proxy virtual machine mode and a direct-to-host mode, and wherein the selecting of the data transport mode is based at least in part on whether the backup is a full backup or an incremental backup of the source virtual machine;
    transmitting, to a host for the source virtual machine and based at least in part on the selected data transport mode, a request to activate the selected data transport mode;
    receiving, at the storage cluster based at least in part on transmitting the request, the data from the source virtual machine via the selected data transport mode; and
    using the data received via the selected data transport mode to create the backup at the storage cluster.

2. The method of claim 1, wherein selecting the data transport mode comprises:
    selecting the proxy virtual machine mode as the data transport mode based at least in part on the backup being the full backup of the source virtual machine, wherein the data is received from at least one proxy virtual machine based at least in part on selecting the proxy virtual machine mode.

3. The method of claim 2, wherein the backup is the full backup based at least in part on the backup being an initial backup of the source virtual machine or based at least in part on a user input.

4. The method of claim 1, wherein the selecting of the data transport mode is further based at least in part on a size of the data to be transferred from the source virtual machine relative to a threshold size, and wherein at least one of the size of the data to be transferred or the threshold size is based at least in part on whether the backup is the full backup or the incremental backup.

5. The method of claim 1, wherein selecting the data transport mode comprises:
    selecting the direct-to-host mode based at least in part on the backup being the incremental backup of the source virtual machine, wherein the data from the source virtual machine is received via a secure socket layer established by a centralized management utility of the host.

6. The method of claim 1, further comprising:
    calculating, based at least in part on selecting the proxy virtual machine mode, a number of proxy virtual machines to use for the backup of the source virtual machine, wherein the data is received from the source virtual machine via the calculated number of proxy virtual machines.

7. The method of claim 6, wherein calculating the number of proxy virtual machines comprises:
determining a size of a virtual disk corresponding to the source virtual machine;
determining a number of child jobs to perform the backup of the source virtual machine based at least in part on the size of the virtual disk; and
calculating the number of proxy virtual machines based at least in part on the number of child jobs.

8. The method of claim 7, wherein:
a proxy virtual machine is limited to a maximum number of child jobs based at least in part on a number of ports attachable to the proxy virtual machine, and
the number of proxy virtual machines is calculated based at least in part on the maximum number of child jobs.

9. The method of claim 7, wherein receiving the data comprises:
receiving, via a first child job of the number of child jobs, a first portion of the data from a proxy virtual machine of the number of proxy virtual machines, wherein the first child job uses one or more ports of the proxy virtual machine; and
receiving, via a second child job of the number of child jobs, a second portion of the data from the proxy virtual machine, wherein the second child job uses at least one other port of the proxy virtual machine or at least one port of the one or more ports after the first child job releases the at least one port.

10. The method of claim 1, wherein receiving the data comprises:
receiving the data from the source virtual machine via at least one proxy virtual machine based at least in part on selecting the proxy virtual machine mode and according to a first backup job.

11. The method of claim 10, further comprising:
receiving additional data from a second source virtual machine via the at least one proxy virtual machine according to a second backup job, wherein the at least one proxy virtual machine is shared by the first backup job and the second backup job.

12. The method of claim 10, further comprising:
transmitting, to the host via the at least one proxy virtual machine, data to recover a second source virtual machine at the host according to a recovery job, wherein the first backup job and the recovery job share the at least one proxy virtual machine.

13. The method of claim 10, wherein receiving the data via the at least one proxy virtual machine comprises:
receiving a first portion of the data via a first proxy virtual machine; and
receiving a second portion of the data via a second proxy virtual machine such that the first backup job is allocated to the first proxy virtual machine and the second proxy virtual machine.

14. The method of claim 1, further comprising:
receiving a second trigger indication to recover a second virtual machine at the host;
selecting, based at least in part on receiving the trigger indication to recover the second virtual machine, the proxy virtual machine mode to export data for recovering the second virtual machine; and
exporting the data for the second virtual machine to the host via at least one proxy virtual machine based at least in part on selecting the proxy virtual machine mode.

15. The method of claim 14, further comprising:
calculating a number of proxy virtual machines for exporting the data based at least in part on a number of virtual disks corresponding to the second virtual machine, a maximum number of data streams, or a combination thereof.

16. The method of claim 1, further comprising:
using an on-demand proxy virtual machine or a persistent proxy virtual machine to receive the data from the source virtual machine based at least in part on selecting the proxy virtual machine mode.

17. The method of claim 1, wherein selection of the proxy virtual machine mode results in instantiation of a proxy virtual machine at the host and selection of the direct-to-host mode avoids overhead associated with instantiation of the proxy virtual machine.

18. The method of claim 1, wherein the proxy virtual machine mode is a HotAdd mode that instantiates a proxy virtual machine to transfer the data and the direct-to-host mode is a network block device (NBD) mode that transfers the data without instantiation of the proxy virtual machine.

19. An apparatus, comprising:
one or more processors;
one or more memories coupled with the one or more processors; and
instructions stored in the one or more memories and executable by the one or more processors to cause the apparatus to:
receive a trigger indication to create, at a storage cluster, a backup of data of a source virtual machine;
select, after receiving the trigger indication, a data transport mode to use for reading the data from the source virtual machine to create the backup at the storage cluster, wherein the selecting is from among a set of data transport modes that comprises a proxy virtual machine mode and a direct-to-host mode, and wherein the selecting of the data transport mode is based at least in part on whether the backup is a full backup or an incremental backup of the source virtual machine;
transmit, to a host for the source virtual machine and based at least in part on the selected data transport mode, a request to activate the selected data transport mode;
receive, at the storage cluster based at least in part on transmitting the request, the data from the source virtual machine via the selected data transport mode; and
use the data received via the selected data transport mode to create the backup at the storage cluster.

20. A non-transitory computer-readable medium storing code, the code comprising instructions executable by one or more processors to:
receive a trigger indication to create, at a storage cluster, a backup of data of a source virtual machine;
select, after receiving the trigger indication, a data transport mode to use for reading the data from the source virtual machine to create the backup at the storage cluster, wherein the selecting is from among a set of data transport modes that comprises a proxy virtual machine mode and a direct-to-host mode, and wherein the selecting of the data transport mode is based at least in part on whether the backup is a full backup or an incremental backup of the source virtual machine;

transmit, to a host for the source virtual machine and based at least in part on the selected data transport mode, a request to activate the selected data transport mode;

receive, at the storage cluster based at least in part on transmitting the request, the data from the source virtual machine via the selected data transport mode; and use the data received via the selected data transport mode to create the backup at the storage cluster.

* * * * *